US008583446B2

(12) United States Patent
Williams

(10) Patent No.: US 8,583,446 B2
(45) Date of Patent: Nov. 12, 2013

(54) SYSTEM AND METHOD FOR AUTOMATED TRAINING AND CERTIFICATION FOR RADIO FREQUENCY SAFETY AND REGULATORY COMPLIANCE AT WIRELESS TRANSMISSION SITES

(75) Inventor: Douglas M. Williams, Del Mar, CA (US)

(73) Assignee: RF Check, Inc., Del Mar, CA (US)

( * ) Notice: Subject to any disclaimer, the term of this patent is extended or adjusted under 35 U.S.C. 154(b) by 1471 days.

(21) Appl. No.: 12/023,901

(22) Filed: Jan. 31, 2008

(65) Prior Publication Data
US 2009/0198502 A1    Aug. 6, 2009

Related U.S. Application Data

(63) Continuation-in-part of application No. 11/394,555, filed on Mar. 31, 2006, now Pat. No. 7,570,922, which is a continuation-in-part of application No. 11/100,947, filed on Apr. 6, 2005, now abandoned, which is a continuation-in-part of application No. 10/215,495, filed on Aug. 8, 2002, now abandoned.

(51) Int. Cl.
*G06Q 10/00* (2012.01)
*G06Q 90/00* (2006.01)

(52) U.S. Cl.
USPC .......................................... 705/1.1; 705/500

(58) Field of Classification Search
USPC ................................................. 705/1.1, 500
See application file for complete search history.

(56) References Cited

U.S. PATENT DOCUMENTS

| | | | |
|---|---|---|---|
| 6,784,973 B1 * | 8/2004 | Wozniak et al. ................ 355/40 |
| 7,088,997 B1 * | 8/2006 | Boehmke ...................... 455/423 |
| 2002/0125999 A1 | 9/2002 | Cho et al. |
| 2002/0133363 A1 | 9/2002 | Bozich |
| 2003/0210228 A1 | 11/2003 | Ebersole et al. |
| 2004/0030562 A1 * | 2/2004 | Williams .......................... 705/1 |
| 2007/0027732 A1 * | 2/2007 | Hudgens .......................... 705/7 |
| 2007/0238416 A1 | 10/2007 | Williams |

OTHER PUBLICATIONS

Commonwealth of Virginia, "Commonwealth of Virginia RF Radiation Exposure Compliance Plan for Building- and Tower-based Antenna Sites, Mobiles and Maintenance", Apr. 1, 2000, p. 13 and Attachment D.*
International Search Report and Written Opinion for PCT/US2009/030871 dated May 22, 2009.

* cited by examiner

*Primary Examiner* — Jonathan Ouellette
*Assistant Examiner* — Michael Thompson
(74) *Attorney, Agent, or Firm* — Procopio, Cory, Hargreaves & Savitch LLP

(57) ABSTRACT

Computer based system which provides wireless site specific RF safety information and promotes protection of all concerned individuals from RF radiation. The System further informs contractors, workers, site owners, and FCC licensees bow to comply with federal, state and local RF safety standards and regulations. The system provides a method for managing and accommodating RF safety training and certification relating to the radio transmission sites. The system includes a database of transmission sites with corresponding antenna systems including maps of maximum permissible exposure limits, site physical layouts and camera images. The system provides a site specific RF safety summary sheet only to users having a predetermined training certification status. The system further includes recordation of training process, testing results, certification status, and delivery of RF safety summary sheets to users.

16 Claims, 25 Drawing Sheets

SYSTEM AND METHOD FOR AUTOMATED TRAINING AND CERTIFICATION FOR RADIO FREQUENCY SAFETY AND REGULATORY COMPLIANCE AT WIRELESS TRANSMISSION SITES

This application is a continuation-in-part of U.S. application Ser. No. 11/394,555, filed Mar. 31, 2006 (now U.S. Pat. No. 7,570,922, issued Aug. 4, 2009), which is a continuation-in-part of U.S. application Ser. No. 11/100,947, filed Apr. 6, 2005 now abandoned, which is a continuation-in-part of U.S. application Ser. No. 10/215,495, filed Aug. 8, 2002 now abandoned.

BACKGROUND

1. Field of the Invention

This invention relates generally to information storage and retrieval systems and more particularly to such a system particularly adapted for the monitoring and control of energy transmission sites for worker safety.

2. Related Art

The current systems of protecting field workers from radio frequency ("RF") exposure at radio transmission sites are inadequate and often in violation of existing state and federal regulations. There are currently enormous cellular networks consisting of thousands of base station antennas which are required to enable cell phone use. These wireless transmission sites come with an environmental hazard as they generate RF radiation. RF radiation ("RFR") is tasteless, odorless and invisible, increasing the need for a comprehensive RF safety compliance program. The damaging health effects from excessive RF exposures are well documented but may not be apparent until long after the exposures occurred. On a daily basis, unaware and unprotected construction and maintenance workers, as well as the industry's own RF-trained workforce, risk sustaining some form of injury from RF radiation exposure at conventional and stealth sites. The present system of signs to warn workers is inaccurate and ambiguous. In many instances warning signs are missing or poorly placed, and have text that is ambiguous or difficult to interpret. The swift expansion of the wireless industry and the number of transmission sites has increased dramatically over the last decade. Many sites contain multiple antennas owned by different cellular phone companies, wireless data carriers, wireless network companies and other providers of wireless services "wireless telecommunication companies". For example some of these companies such as Sprint Nextel, Verizon and AT&T or other wireless telecommunication companies may all have an antenna at one site. Sites that are used by more than one wireless company may have greater dangers due to the overlap of energy dispersion patterns. This overlapping dispersion condition is not taken into account by any single company, primarily due to poor mutual information availability.

Wireless telecommunication companies provide equipment and training to their own workforce but do not provide the same to other workers such as roofers, painters or heating, ventilation and air-conditioning craftsmen who work near their transmitters. Personal protection monitors have severe limitations and can give a false sense of security. Wireless telecommunication companies have a poor policy regarding the hazards of RF exposure with site lessors. Little or no information is available to educate lessor's third party workers on safety procedures. Stealth sites can present the most potential hazards to unsuspecting third party workers. As a result, third party workers are at the greatest risk of injury from RF exposure. There is no comprehensive worker safety program in place. Litigation regarding RF exposure is growing and is expected to grow exponentially because of the lack of significant worker safety standards and applications.

SUMMARY

Aspects of the present invention include a computer based system which provides safety information, promotes protection of all interested parties from RFR, and informs workers and wireless telecommunication companies how to comply with federal, state and local RF safety standards and regulations. Aspects of the invention can also provide benefits to federal, state and local municipalities. Additionally, aspects provide for systems and methods which provide RF Certification and site-specific RF Safety Summary Sheets.

One aspect of this invention includes a safety system and method for managing and viewing radio transmission information for transmission sites. In one aspect the system includes a living database, indexed by site, that includes transmitter information and unique characteristics of transmitters located at thousands of transmission sites obtained from a plurality of wireless telecommunication companies. The system can be accessed on line through the World Wide Web network. The system contains cost saving engineering tools, photographs of each antenna, antenna-specific RF information, site spatial configuration, and the ability to deliver MPE (Maximum Permissible Exposure) Maps of the invisible RF emissions to any worker visiting a wireless site. The MPE maps are updated on a regular basis and/or when changes are made to a site.

In one aspect, the system's integration of RF data and MPE tools results in a comprehensive safety net as well as providing cost savings for cities and municipalities who must insure the public's safety. This system also assists in identifying and eliminating interference from rogue transmitters.

In one aspect, the system provides a computerized site specific safety program for each site. This site specific safety program is automatically updated on a regular basis and/or when changes are made to a site. The system has an automated safety audit program which runs periodically, for example, monthly and annually, to confirm that sites are in compliance with all relevant regulations, including international, Federal and State. The automated safety audit program generates compliance reports which can be date stamped and encrypted in order to meet regulatory record keeping requirements. These compliance reports can be provided to regulatory agencies to confirm compliance.

A site search module is configured to define search parameters, accept search criteria selected by a user, transmit a search request based upon selected search criteria, and provide search results to the user. The module also restricts or limits access to the database based upon criteria associated with the user. A user of the system can have their access limited based upon the user's role. For example, a property owner representative can view existing sites on the properties he represents, a licensee or network operator can view existing and proposed sites with his antenna system on it, a local regulator (e.g., a government official) can view existing and proposed sites within his jurisdiction, members of the public can view existing and proposed sites within a defined radius from their residence, and subcontractor companies can view existing sites that it was assigned to work on. The system allows larger organizations, such as wireless service providers, to manage their access to the database according to their internal organization structure. For example the system allows them to create multiple user accounts for their representatives and assign them the access to sites by their region, state or county. A database search module is configured to receive the search query, search the database for resident information based upon the search query, and transmit the search results to the site search module. A site information display module is configured to provide the user with power density information or radiation pattern maps for all of the transmitters located on a site identified in the search results.

In a further aspect, the system includes a power down request module which is configured to send a request to the wireless telecommunication company associated with the site where the antenna structure is located, create a database entry about the power down request, and send a confirmation of power shut down or a power reduction to the user.

In further aspect the site search module allows the user to obtain information on site safety for specific sites.

In a further aspect, the system includes an engineering tools module which allows the user to create hypothetical antennas which can be placed into an existing site thereby allowing the user to create MPE maps with the hypothetical antenna and one or more existing antenna at the site, determine intermodulation between the hypothetical antenna and one or more of the existing antennas, and determine isolation between the hypothetical antenna and one or more of the existing antennas. The User can also modify RF information of the existing antennas and review how this change affects existing MPE maps, intermodulation and isolation.

A further aspect includes a method for receiving data from a plurality of sources about radio transmission sites, which have one or more antenna. In one embodiment the system receives data from various wireless telecommunication companies such as Verizon, AT&T, and Sprint Nextel. The method includes receiving data from a plurality of sources, maintaining a database with the received data, receiving queries from users regarding radio transmission sites, transmitting data maintained in the database to customers, and processing queries from users regarding a radio transmission site and presenting MPE maps based on the data in the database.

A further aspect includes a computerized system and method that provides RF Certification to employees (or others) of those entities that access transmission sites. The certification can include training and testing provided by the system. The system can also generate and issue the site-specific RF safety summary sheet to those users that need it. Furthermore the system provides the ability for contractor companies to obtain a company RF Certification. Once a company becomes certified, they may manage their employees and provide them with a worker RF Certification, and/or issue the site-specific RF safety summary sheet using functionality and methods described herein. Furthermore the system allows the user to complete the required RF certification before accessing the system functionality described above. Furthermore the system allows workers or contractor companies to complete a general RF certification by their own request.

A further aspect includes a proposed site module which is configured to exchange information related to a proposed site between local regulator and the licensee and provides visibility of the proposed site for the all affected parties, including the public. The proposed site module further allows a local regulator to provide access to the information related to a proposed site to third parties such as local regulator's representatives and constituents.

A further aspect includes functionality that allows limited public access to the system information for the purpose of reviewing wireless sites in close proximity to the person's residency. Members of the public can make a request that includes their street address and ZIP code and send such a request using the system. The System then verifies the user's request and sends the user a link where he can review the sites within the given radius from his residency. Various methods for the request verification are used to ensure that request is not used for data mining or other form of system misuse.

Other features and advantages of the present invention should be apparent after reviewing the following detailed description and accompanying drawings which illustrate, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
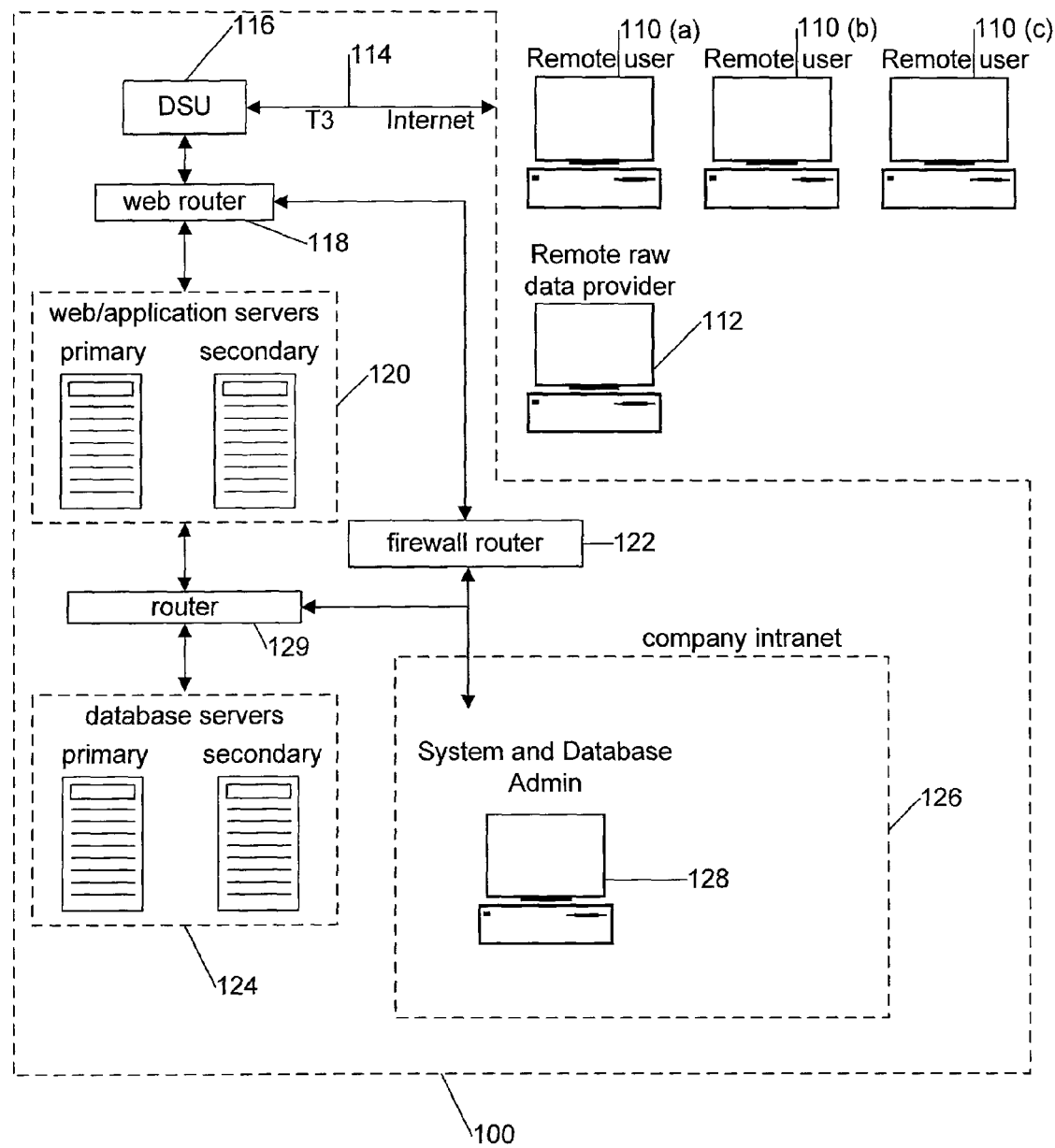
FIG. 1 is a high level block diagram illustrating an example network and the system.

Certain embodiments as disclosed herein provide for systems and methods for a wireless location monitoring and reporting system ("System").

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

The present invention includes a method for using an information storage and retrieval system and includes establishing a database structure enabling the storage of information concerning the locations and utilization characteristics of wireless radio frequency (RF) transmitting facilities (referred to as sites) such as those used in cellular telephone networks and for the commercial telecommunication industry. The system and methods provide site-specific safety information and tools for protecting workers from RFR hazards and provide auditing in order to document compliance with applicable regulations.

Electronic access to the information database can be made available over the Internet to the Systems' subscribers, referred to as "users" in this specification. Maximum Permissible Exposure (MPE) maps and the data necessary to create the spatial representations of the site configuration are created using the information database. The Systems and methods described herein can provide greater worker safety, eliminate the disproportional amount of liability currently shouldered by wireless telecommunication companies, and reduce RF exposure to persons involved in site management.

Figure ("FIG.") 1 is a high level block diagram of an example network including the System 100. The System 100 can communicate with users via an external network 114 such as the internet Reference to a user or users herein refer to individuals interacting with the System 100 (and other embodiments described herein) via a computer interface. The computer interface can be directly with the System or via another computer or device which communicates with the System. As an example, the remote users 110a-c and a remote raw data provider 112 are shown. The System also includes a system and database administration module 128 within the company intranet 126 which can interact with the System directly. When communication traffic first enters the System 100 it passes through a data switch unit ("DSU") 116. The traffic from the DSU is passed to a web router 118. From the web router the traffic flows to the web application servers 120. The web application servers in general, provide user interfaces. In one embodiment the web application servers include a primary load balanced application server and a back-up secondary server. The web application servers 120 communicate through a firewall router 122 with the database servers 124.

Figure 2:
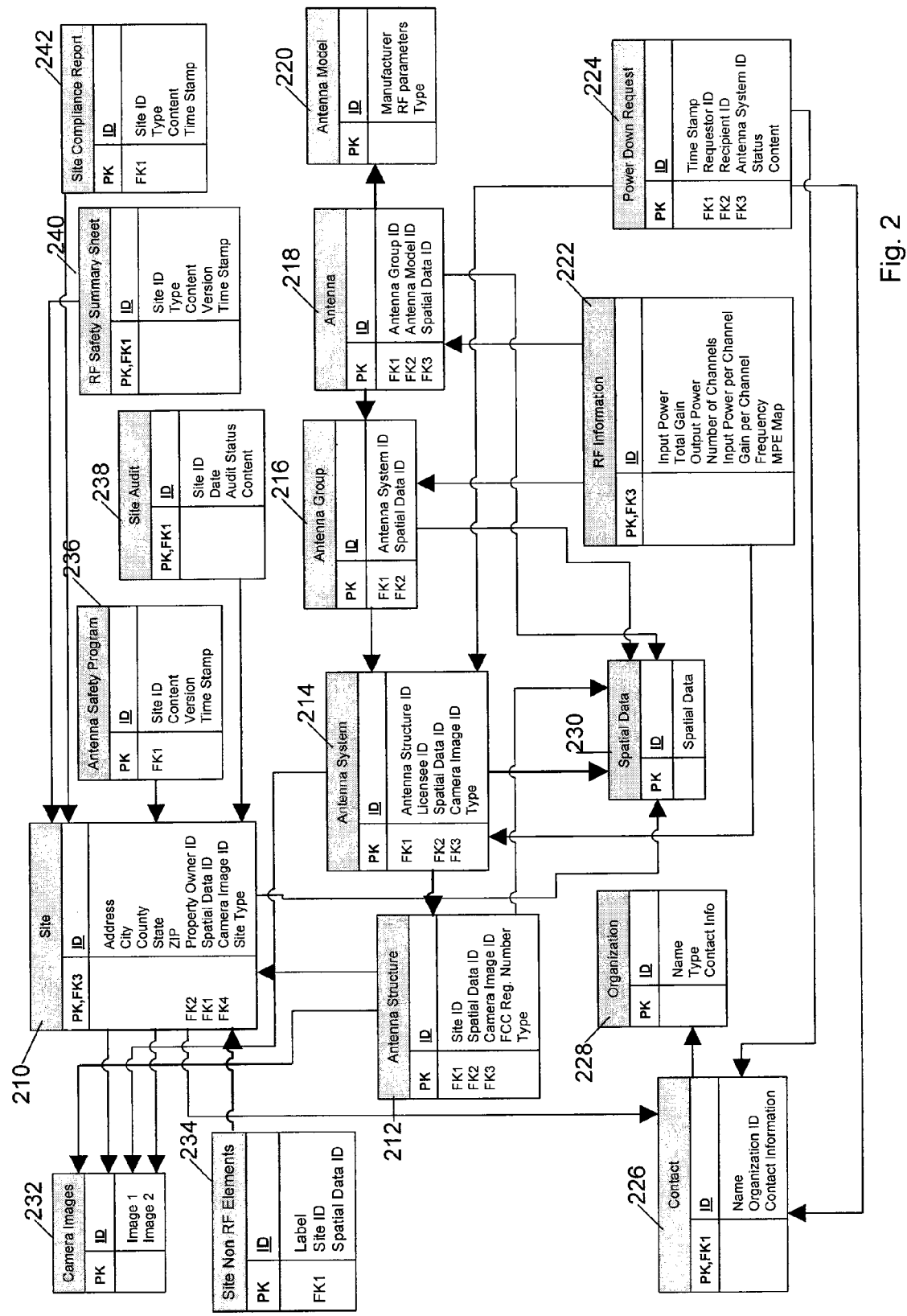
FIG. 2 is a database diagram or schema illustrating an example of a site's attributes.

FIG. 2 is a database diagram or schema illustrating an example of an RF site database of a site's attributes. The database can be implemented on the database servers 124 of FIG. 1. In one embodiment this technology is built on the Microsoft N-tier Distributed Network Architecture ("DNA"), which separates the database, data access, business logic, and presentation layers to provide ultimate security, scalability and performance for high volume database applications. The database includes multiple tables which each have resident information. In the embodiment depicted in FIG. 2, a subset of the database data is presented to illustrate the key elements of the system.

Site table 210 has following key attributes: ID which is unique identifier for the site; site's address, including street Address, City, County, State and ZIP; Property Owner ID which is associated with the Contact table 226 and identifies a site's property owner; Spatial Data ID which is associated with the table Spatial Data 230 and identifies spatial data of the site, which will explained in connection with FIGS. 9 and 10; Camera Image ID which is associated with table Camera Image 232 and identifies camera images used by module 435 of FIG. 4, which will be explained later.

Antenna Structure table 212 has following key attributes: unique ID; Site ID which is associated with the table Site 210 and identifies the site which antenna structure was assigned to; Spatial Data ID which is associated with the table Spatial Data 230 and identifies spatial data of the antenna structure, which will explained in connection with FIGS. 9 and 10; Camera Image ID which is associated with table Camera Image 232 and identifies camera images used by module 435 of FIG. 4, which will be explained later; FCC Reg. Number which is an unique number assigned to antenna structure by Federal Communications Commission; Type identifies antenna structure types such as electric pole or tower.

Antenna System table 214 has following key attributes: unique ID; Antenna Structure ID which is associated with the table Antenna Structure 212 and identifies the Antenna Structure which the Antenna System was assigned to; Licensee ID which is associated with the table Contact 226 and identifies the licensee such as Verizon Wireless or AT&T; Spatial Data ID which is associated with the table Spatial Data 230 and identifies spatial data of the antenna system, which will explained in connection with FIGS. 11 and 12; Camera Image ID which is associated with table Camera Image 232 and identifies camera images used by module 435 of FIG. 4; Type identifies the antenna system type such as array of panel antennas.

Antenna Group table 216 is used to join individual antennas into to group for the purpose of assigning RF Information. Antenna Group has following key attributes: unique ID, Antenna System ID which is associated with the Antenna System table 214 and identifies the Antenna System which antenna group was assigned to; Spatial Data ID which is associated with the table Spatial Data 230 and identifies spatial data of the antenna group, which will explained in connection with FIGS. 11 and 12;

Antenna table 218 has following key attributes: unique ID; Antenna Group ID which can be associated with the Antenna Group 216, Antenna Model ID which is associated with the table Antenna Model 220 and identifies antenna model; Spatial Data ID which is associated with the table Spatial Data 230 and identifies spatial data of the antenna.

RF Information table 222 stores the information used to calculate power density levels used for creating MPE maps by module 430 of FIG. 4 and for the Engineering tools functionalities of module 436 of FIG. 4 and will be explained in connection with FIG. 6. Table has following key attributes: Input Power, Total Gain, Output Power, Number of Channels, Gain per Channel, Frequency and MPE Map.

Table Power Down Request 224 is used to store information related to functionality of the module 434 of FIG. 4, which will be explained in connection with FIG. 7. Table has following key attributes: unique ID; Time Stamp which includes exact time and date in which power down was requested; Requestor ID which is associated with the table Contact 226 and identifies the person that requested the power down; Recipient ID which is associated with the table Contact 226 and identifies the recipient of the power down request; Antenna System ID which is associated with the table Antenna System 214 and identifies the antenna system which needs to be powered down; Status which indicates a current status of the power down request such as placed, received, or replied; Content which includes a detail information about the power down request.

Figure 4:
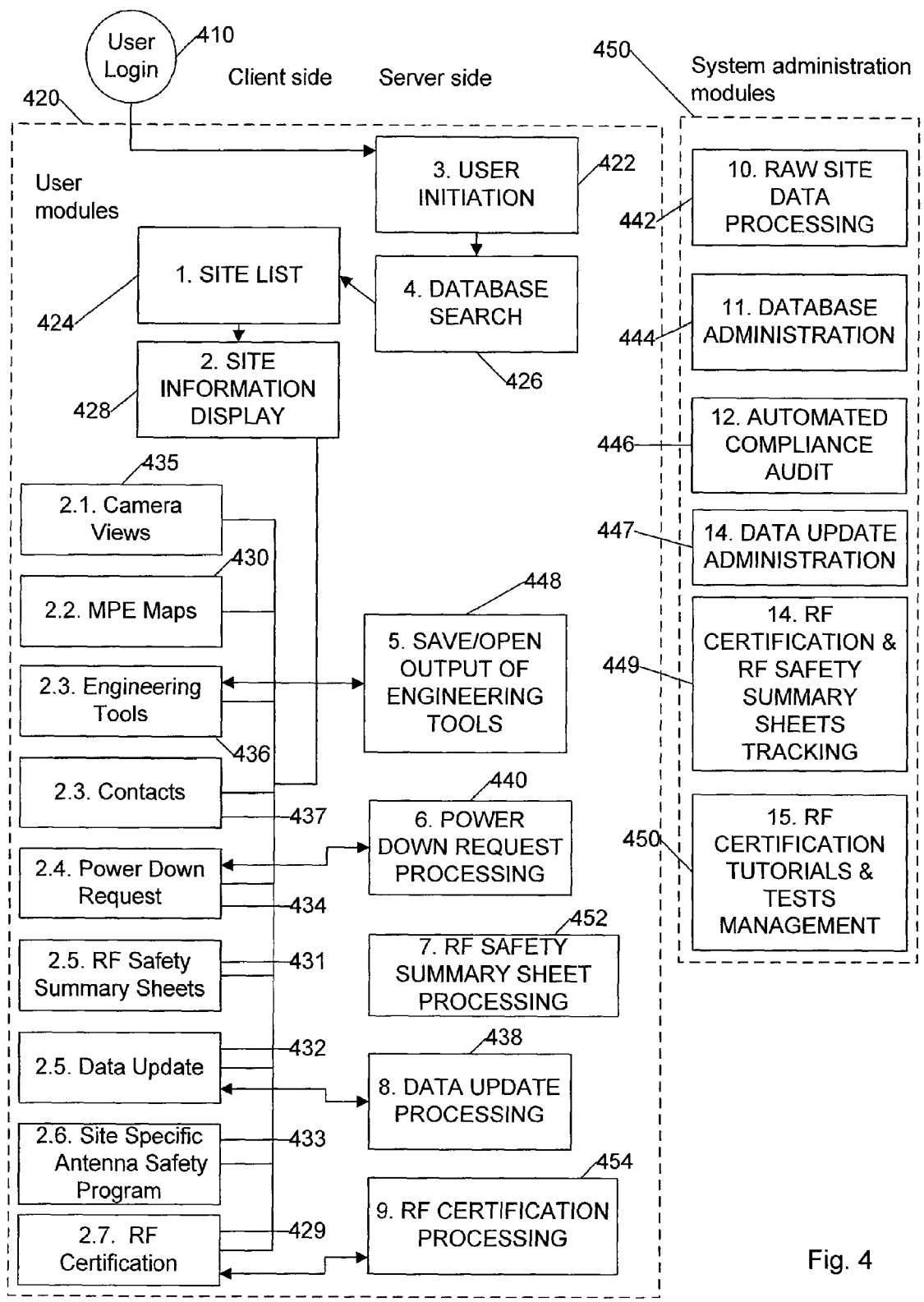
FIG. 4 is a functional block diagram illustrating the functions or modules of one embodiment of the system.

Table Site Non RF Elements 234 identifies the non-RF elements of the site such as equipment rooms, hatches, or fences. Table has following key attributes: unique ID; label which is displayed on various graphic representations of the site; Site ID which is associated with the table Site 210 and identifies the site which elements was assigned to; Spatial Data ID which is associated with the table Spatial Data 230 and identifies spatial data of the non-RF element, which will explained in connection with FIGS. 9, 10, 11 and 12;

Antenna Safety Program table 236 stores site-specific antenna safety programs associated with the site and is related to module 433 of FIG. 4. Table has following key attributes: unique ID, Site ID which is associated with the table Site 210 and identifies the site which antenna safety program was assigned to; version number which is used to identify various version of the antenna safety program associated with the same site and will be explained in connection with FIG. 19; Time Stamp indicates the data and time when the version of antenna safety program was created.

Table Site Audit 238 stores the information related to site-specific RF compliance audits. Table has following key attributes: unique ID; Site ID which is associated with the table Site 210 and identifies the site which site audit was assigned to; Date which identifies the actual date of the audit; Audit Status identifies a compliance status of the site such as in compliance, or not in compliance; Content includes detailed information related to audit.

RF Safety Summary Sheet (site specific) table 240 stores RF safety summary sheets provided by system to workers, it is related to functionality of the module 431 of FIG. 4. and will be explained in connection with FIG. 14. Table has following key attributes: unique ID, Site ID which is associated with the table Site 210 and identifies the site which RF safety summary sheet was assigned to; Type indicates type of the sheet such as trained worker or general worker; Content attributes includes a content of the sheet such as camera images, MPE maps, or site contact information; Version stores the identifier of the version of RF summary safety sheet for future reference; Time Stamp stores the date and time when RF safety summary sheet was created.

Site Compliance Report table 242 includes the information related to function of module 446 of FIG. 4 and will be explained in connection to FIGS. 20 and 21. Table has following key attributes: unique ID; Site ID which is associated with the table Site 210 and identifies the site which compliance audit was assigned to; audit Type such as monthly or annual; Content which in details describes compliance status of the site; Time Stamp stores the date and time when compliance report sheet was created.

Figure 3:
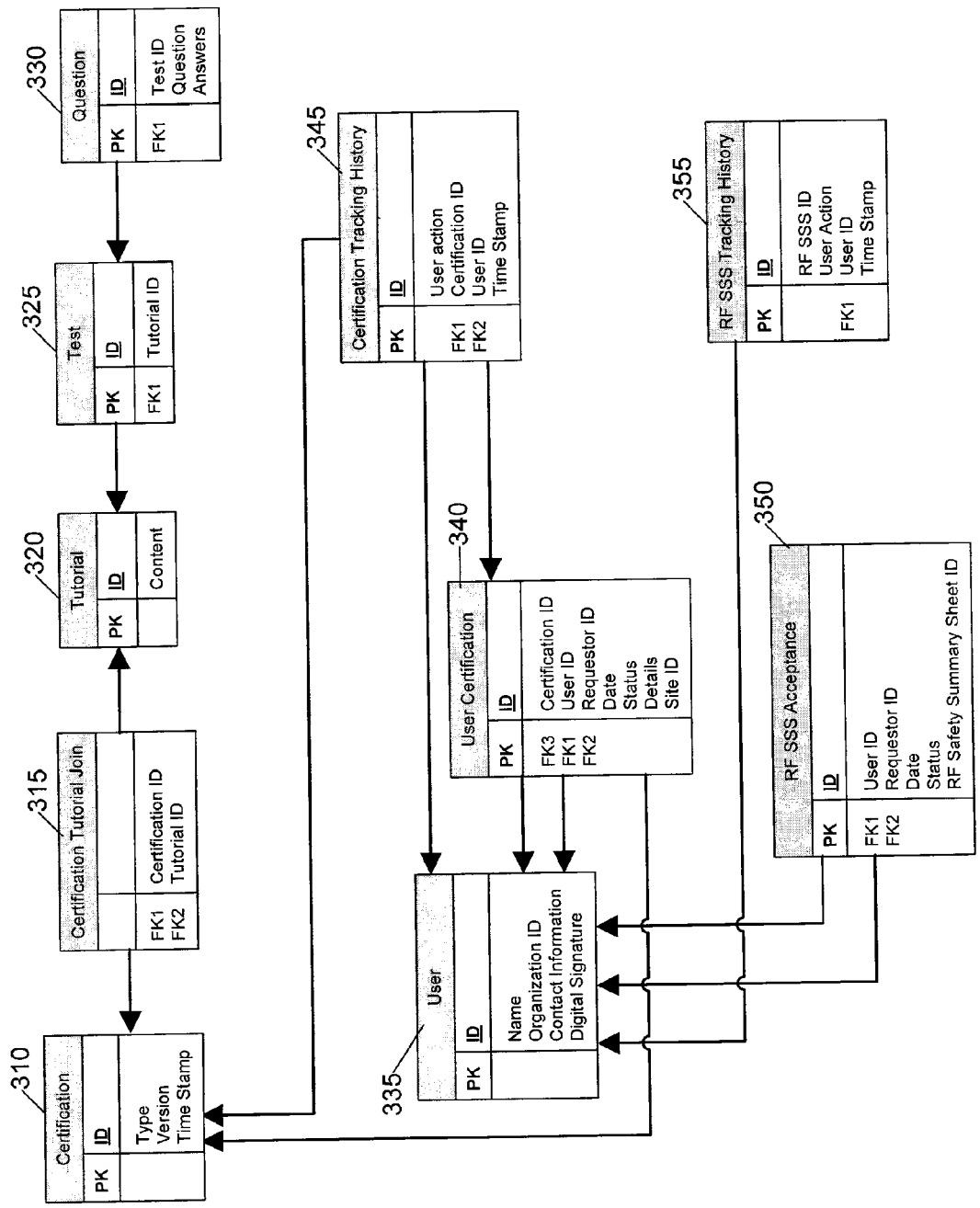
FIG. 3 is a database diagram or schema illustrating the RF Certification and RF Safety Summary Sheet attributes.

FIG. 3 is a database diagram or schema illustrating the attributes related to RF Certification and (site specific) RF safety summary sheets. Tables can be implemented on the database server 124 of FIG. 1. The schema includes a tables and data related to functionalities of modules 431 and 429 of FIG. 4. Additionally, the tables can include a data described later in connection with FIGS. 22-26.

Table Certification 310 includes a various versions of the RF Certification and it is used for a new system user who requires RF certification, worker, or contractor company. Table has following key attributes: unique ID; Type which indicates certification type such as Property Owner Representative RF certification, or Trained Worker RF certification; Version which indicates a version of the certification and is used for the future reference; Time stamp is a date and time when the certification was created.

Table Tutorial 320 includes various tutorials that can be assigned to multiple certifications. A table has unique ID and attributes Content which stores actual content of the certification tutorial. Multiple tutorials can be associated with the multiple certification using table Certification Tutorial Join 315. Each tutorial of the certification is followed by an appropriate test which includes various questions. Table Question 330 includes test questions and the possible answers with indication of the correct answer. The table Question is associated with table Test 325 which is associated with the table Tutorial 320.

Table User Certification 340 stores a history of certifications taken by system users. Table has following attributes: unique ID; Certification ID which is associated with the table Certification 310 and identifies the certification; User ID which is associated with the table User 335 and identifies the user who took certification; Requestor ID which is associated with the table Users 335 and identifies the requester of the certification; Date which indicated the date when certification was taken; Status indicates status of the certification such as completed or uncompleted; Details includes certification test results; Site ID is associated with the Site table 210 of FIG. 2 and indicates the site if the certification was site-specific.

Table Certification Tracking History is used to provide a detail view of the steps taken by user during the certification, including user's answers to the test questions and tracking of the time user spent on various sections of the certification. The table has following key attributes: unique ID; User action that stores each step user takes during the certification; Certification ID which is associated with the table 310 and identifies certification; User ID which I associated with the table User 335 and identifies the user; Time Stamp that store exact date and time per user action.

Table RF SSS Acceptance 350 is used to track user's acceptance of the site-specific RF safety summary sheets. Table has following key attributes: unique ID; User ID which is associated with the table User 335 and identified the user who accepted RF safety summary sheet; Requestor ID which is associated with table User 335 and identifies the user who requested acceptance of the RF safety summary sheet; Date indicates the day when the RF safety summary sheet was acknowledged, Status indicated the status of the request such as requested or acknowledged; RF Safety Summary Sheet ID which is associated with the table 240 of FIG. 2 and indicates the RF safety summary sheet.

Table RF SSS Tracking History is used for tracking the user's actions related to acceptance of RF safety summary sheets. The table has following key attributes: unique ID; User action that stores each step user takes during the acceptance of the RF safety summary sheet; RF SSS ID which is associated with the table 240 of FIG. 2 and identifies RF safety summary sheet; User ID which I associated with the table User 335 and identifies the user; Time Stamp that store exact date and time per user action.

FIG. 4 is a functional block diagram illustrating the functions or modules of one embodiment of the System 100 of FIG. 1. The System includes user modules 420 and system administration modules 430. The user modules 420 provide the operational functionality of the System and the system administration modules provide the administration functionality. The user modules are divided into client side modules and server side modules. The client side modules generally provide the interface functionality for the user interaction. In one embodiment the client side modules run on a remote user computer FIG. 1 110(*a-c*) and provides a graphic interface to users. The Server side modules run on the server side on the web/application server FIG. 1 120, and interact with database servers 124 and send output to client side.

On the server side the user modules include a user initiation module 422, a database search module 426, a power down request processing module 440, a save/open output of engineering tools module 448, data update processing module 438, RF safety summary sheet processing module 452 and RF certification processing module 454. On the user side the user modules include a site search module 424, a site information display module 428, a camera view module 435, an MPE maps module 430, an engineering tools module 436, a contacts module 437, a power down request module 434, a RF Summary Sheets module 431, a data update module 432, a site specific safety program module 433 and RF certification module 429.

The user initiation module 422 implements the user logon function (410) including determining whether the user has authorization to use the System and determining what rights the particular user has. This can include providing an initial page that can be accessed as an initial entry point for accessing the system. Database Search module 426 searches the database of the sites based on user's role in the system and will be explained in connection with FIG. 5. The database search module 426 resides on web/application servers 120 and interacts with the database servers 124 of FIG. 1. The database search module 426 searches the data base using the various search criteria and provides the results to the site list module 424. Site list module 424 provides user with the list of the sites he is authorized to view.

The site information display module 428 provides the user with information about a specific site. In one embodiment, the site information display module shows the user the site top preview, the geographic map preview, the site panoramic view or a slideshow of the site's camera views and site information. The site top preview is generated from data in the database. In one embodiment the system creates a site top and side preview map and shows site plot map—a graphic representation of all site elements with the MPE maps. The geographic map preview can be generated using web services or stored images and displays sites on a geographic map. The module allows the user to click on a zoom button or the image itself and a zoomed map view is displayed with a dot that represents the site location. In one embodiment in order to generate the site panoramic view or slideshow of the site's camera views, the camera module 435 loads an external panoramic image of the site to a system component allowing a simulation of the panoramic view and zoom, or slideshow of the site's camera views. For the site information the module displays site information which includes the items set forth in the site table of FIG. 2 (210). The module can vary the site information presented based on the type of user or rights of a user as set forth in the system user database.

From the site information display module 428 the user can choose to use the functions of the camera view module 435, the MPE map display module 430, the data update module 432, the power down request module 434, the engineering tools module 436, the contacts module 437, the RF Safety Summary Sheets module 431 and the site specific antenna safety program module 433. A user can also enter the RF certification module 429. However, this module can also be entered or accessed directly from the user initiation module 422. The site specific program module displays a site specific safety program to a user. This module also updates the site specific safety program when changes are made to a site. The functionality of this module will be explained in connection with FIG. 19.

The camera views module 435 loads and displays multiple types of camera site views. In one embodiment these views include far and close view. These views are retrieved from the data structure shown in FIG. 2.

Figure 11:
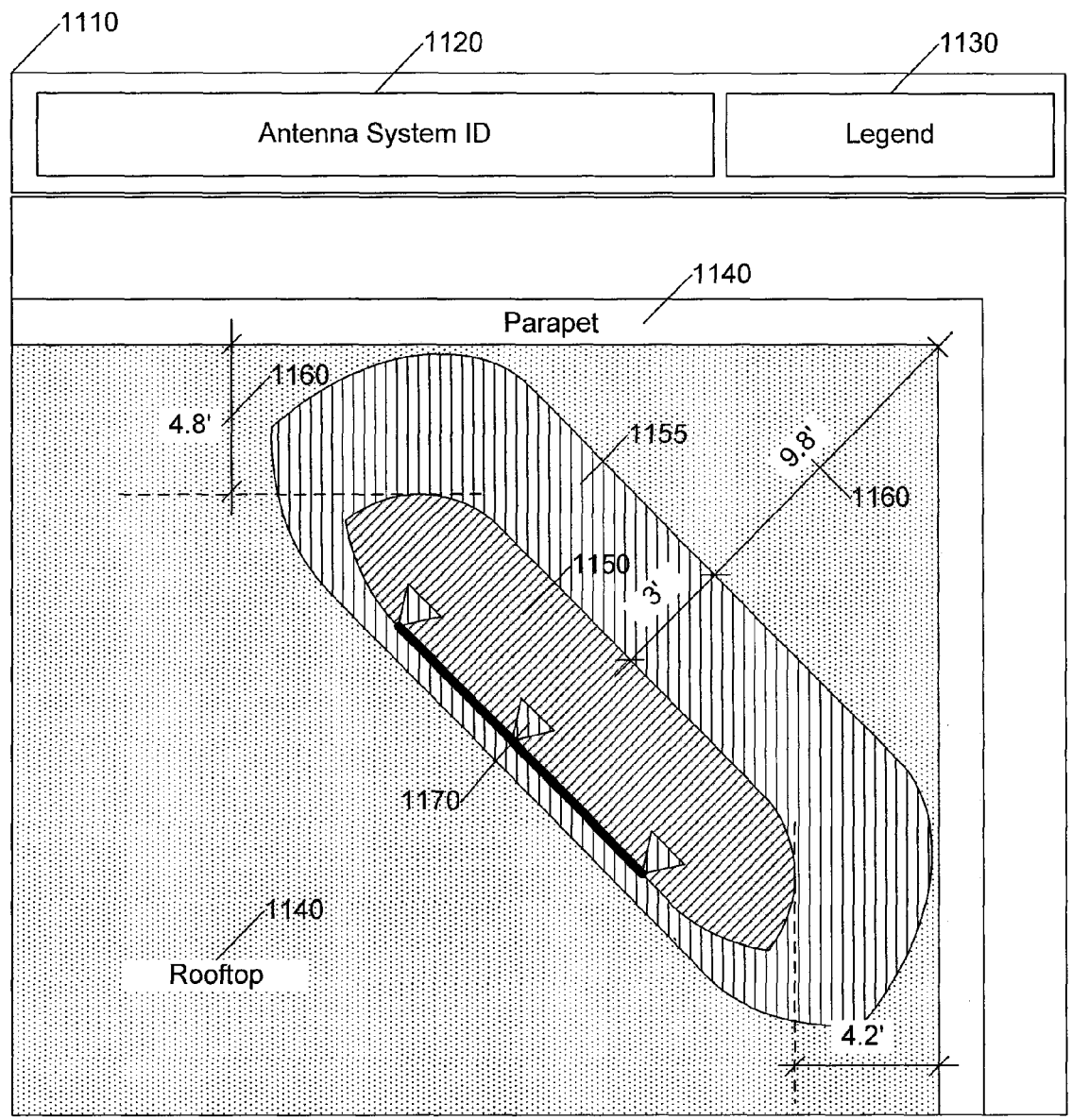
FIG. 11 is a graphical representation of a single antenna system on the site including MPE Maps from top view perspective.
Figure 12:
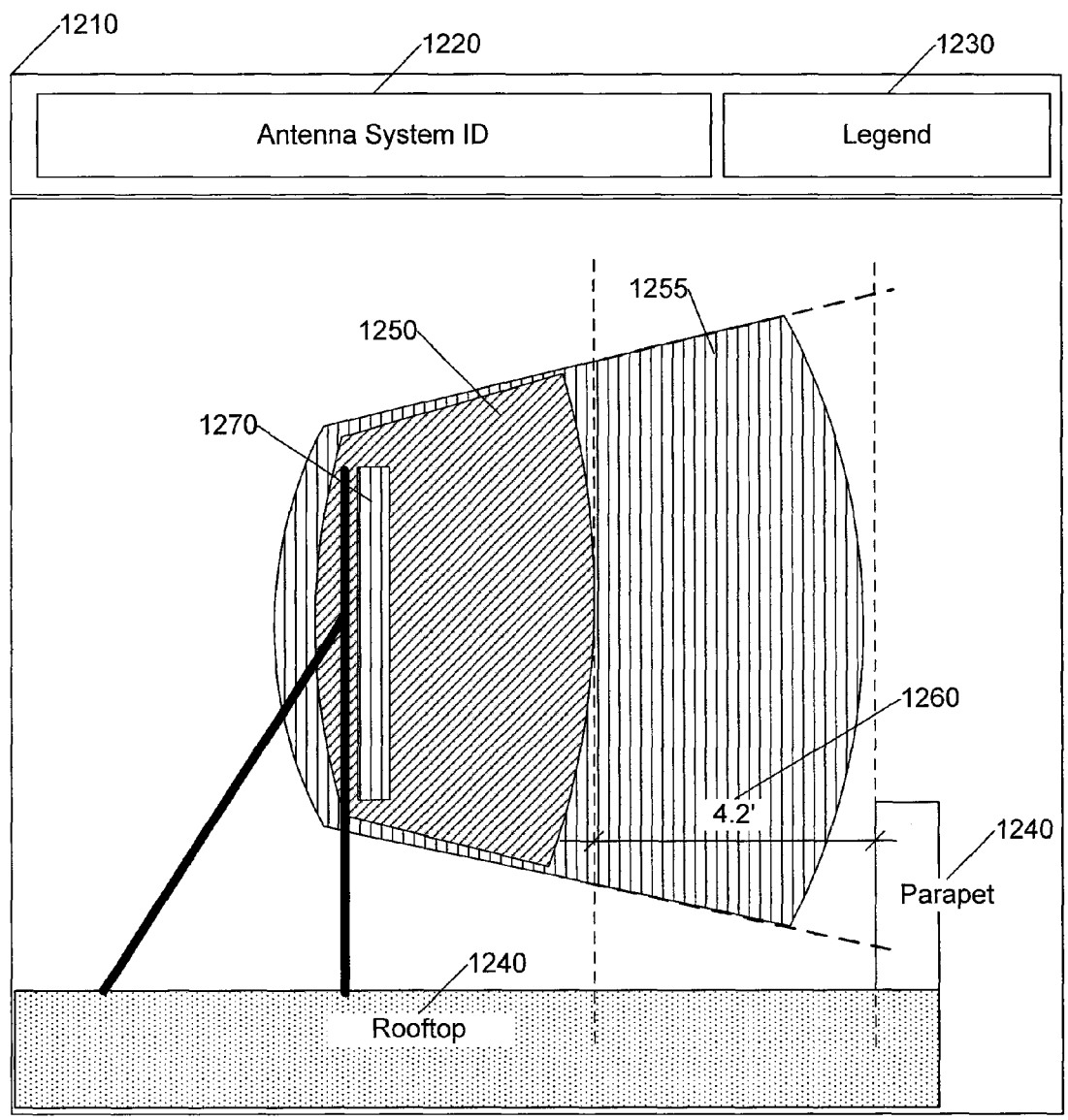
FIG. 12 is a graphical representation of a single antenna system on the site including MPE Maps from side view perspective.

The MPE map display module 430 displays the sites antenna structures showing all the site's elements and the associated MPE maps. FIGS. 11 and 12 provides examples of the MPE map views. In one embodiment, this enables any worker or individual visiting any wireless site in the United States to see the invisible occupational controlled and restricted RF patterns. These RF pattern maps can be updated on a daily basis and are an integral part of the System's compliance and safety solution.

The data update module 432 allows an authorized user (for example a representative of an organization that operates one or more sites) to edit data of the site antennas that are associated with the authorized user. The data update module also receives data from the wireless telecommunication company who owns the antenna. The module sends the edited data to the data update processing module 438. This data update processing is explained in more detail with FIG. 8 below. The data update processing module provides a site element preview map with selectable antennae structures. In one embodiment a click on an antenna structure displays the following information: antenna label, sector label, antenna structure label, antenna frequency (editable), antenna input power (editable), antenna type (editable), and antenna model (editable). A click on the antennae structure yields an antennae structure zoom view with various antennas each having a link to further screens. A click on a particular antennae yields information including the information set forth in FIG. 2. The data update processing module communicates with the system administration modules 450. The data update module 432 provides the user with the ability to edit editable fields and send updates to the administrator.

The user can also move from the site information display module 428 to the power down request module 434. The power down request module allows the user to request that a particular site's or antenna system at a sites power to be reduced or turned off. The power down request module 434 communicates with the power down request processing module 440. The power down module allows the user to send power down requests for one or multiple antenna system from selected sites. The power down request is sent by email to the broadcaster (operator of the antenna) and a copy of that e-mail to the system administrator. The power down processing module 440 creates a database entry about the power down request and sends confirmation to the user. The scheduled power down request allows the user to send scheduled power down request with information including reason for power down request, selected antenna structures, and date and duration in hours. The power down request has both a manual and automated power down function. A more detailed description of the functioning of the power down request processing module is set forth in connection with FIG. 7 below.

The engineering tools module 436 generates and provides an MPE map based on utilizing dynamic resident database information, and modified data. Utilizing the dynamic resident database information the engineering tools module 436 calculates power densities for antennas in the database including calculations for intermodulation, isolation and creation of a hypothetical site called a "try-out" site discussed in more detail in connection with FIG. 6. For the MPE map, the user can select any antennae from the site to view all information about the antennae. The user can manipulate some of the data to see how it affects the MPE maps. For intermodulation the module calculates the intermodulation between two selected antennas. For isolation the module calculates the isolation between the two selected antennas. The user can create try-out sites by placing new antennas into the site to create a preview of MPE maps or calculate intermodulation and isolation. Intermodulation and isolation studies predict possible interference of radio frequencies transmitted from different antennas and provide important information about the isolation levels required for a compatible site environment. All of these processes will be explained in more detail with FIG. 6.

The contacts module 437 displays to the user contact information including site licensee, site property owner representative and city or municipalities. In one embodiment of a contact contains the following fields: company name, person name, title, phone, fax, cell phone, e-mail, address, city, zip and state.

The RF Safety Summary Sheet module 431 provides the user the ability to review and print Site-specific RF safety summary sheets. The Site Specific Safety Summary Sheet can be provided in two versions. A first version, intended for RF trained workers (explained in more detail below), includes site-specific information for work inside the areas where power density exceeds MPE limits for general, untrained workers. A second version includes site-specific information for work outside the areas where power density exceeded MPE limits and is intended for use by general, untrained workers. If only a black and white printer is available, the module 431 creates a print output suitable for black and white print showing the graphic representation of MPE maps as crosshatched areas. The RF safety summary sheet processing module 452 provides functionally related to sending the request for accepting the RF safety summary sheet to the user and tracking of the request. All of these processes will be explained in more detail with FIG. 22.

The RF certification module 429 and RF certification processing modules provide general and site specific training and certification and tracks the same. The module also provides functionality to ensure that RF certification is completed before providing users with the Site Specific RF safety summary sheet. Furthermore the module allows a user to invite others (e.g., contractor companies) to obtain a company RF Certification. Once a company becomes certified, they may manage their employees and provide them with a trained worker RF Certification via the module, and/or to issue the Site-Specific RF safety summary sheet. Furthermore the system allows workers or contractor companies to complete a general RF certification by their own request. The operation and functionality of the RF certification module 429 is described further below in connection with FIGS. 22-26

The system administration modules 450 include a raw site data processing module 442, a database administration module 444, an automated compliance audit module 446, a data update administration module 447, RF certification & RF safety summary sheet tracking module 449, and RF certification tutorials and test management module 450. Data update administration module 447 sends reminders through notifying a defined contact to update actual attributes of the site. Periodic updates are necessary as there are frequent changes to the actual attributes of sites. The automated compliance audit module 446 provides functionality for database audits. It audits the sites which are controlled by the System on a monthly and annual basis to confirm that they are in compliance with International, Federal and State regulations, for example IEEE, FCC, and California OSHA. In one embodiment the data update administration module handles sending requests for data updates to the users ('out'), and when the user responds ('in) it evaluates updates.

The database administration module 444 includes the functions to manage the application users, manage site data, manage power down requests (set forth in FIG. 7A, 7B), and track application usage. In one embodiment the raw site data processing module 442 performs functions including converting raw data files into the format required by the database structure as seen in FIGS. 2 and 3, and checking the quality of data.

The RF Certification & RF Safety Summary Sheets Tracking module 449 includes functionality that allows system administrator to track all system activities related to RF Certification and providing RF safety summary sheets. System, administrator can review all requests for RF Certification, all attempts to complete RF Certification tutorials and tests including failed, and users' acknowledgements of RF Certifications. System administrator can further review in details user's RF Certification test results with visibility into every question presented and user's answer. System administrator can further review all requests for providing RF safety summary sheets to the worker; all accepted requests, including the user's acknowledgement of the RF safety summary sheets.

The RF Certification Tutorial & Test Management module 450 provides the system administrator with ability to create various RF Certifications types based on the requirements. The System administrator can create tutorials and tests and assign them to the RF Certifications. The module further provides functionality to measure performance of the various RF Certifications using the tracking data retrieved from previous user's attempts to complete RF Certification.

Figure 5:
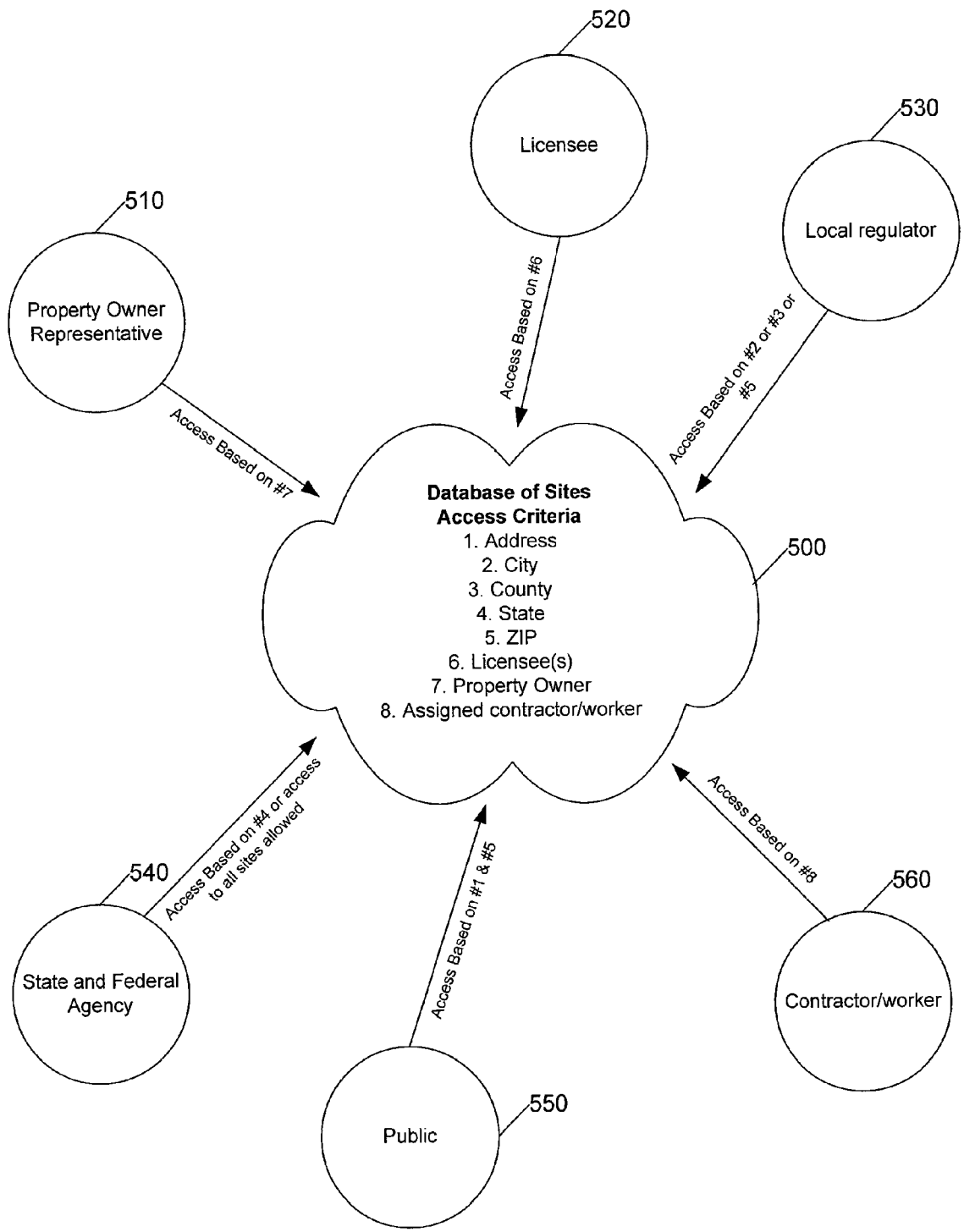
FIG. 5 FIG. 5 is a block diagram illustrating a controlled access to sites based on user's role in the system

FIG. 5 is a block diagram illustrating the controlled access to sites based on user's role in the system. The described process can be implemented by the corresponding modules 410, 422, 426 depicted in FIG. 4. The database 500 can be implemented as the database servers 124 in FIG. 1 which can include the site database depicted in FIG. 2. Though reference is made to "sites" in this description, that refers to the representations of the sites in the database.

Database 500 includes various attributes that can be used for retrieving search query results based upon the users' roles in the system. A property owner representative (510) can view existing sites on the properties he represents; search criteria

7 is used—system displays all sites where the current user—Property Owner Representative—was associated with site attribute "property owner" A licensee or network operator (520) can view existing and proposed sites with his antenna system on it; search criteria #6 is used—the system displays all sites where the current user—Licensee—was associated with the antenna system property "licensee" and those antenna system were associated with the sites.

A local regulator (e.g., a government official) (530) can view existing and proposed sites within his jurisdiction; search criteria #2 or #3 is used—the system displays all sites with the matching city, county, or ZIP code. For example city government can view all sites where the database attribute city equals the government's city. Members of the public (550) can view existing and proposed sites within a defined radius from their residence; search criteria #1 and #54 is used. The System converts the user's defined location into the GPS location and displays sites within the defined radius from that location. Contractor companies or individual workers (560) can view existing sites that they were assigned to work on. This access type is created using functionality of the RF Safety Summary Sheet module 431 and RF Certification module 429 of FIG. 4. State and Federal agencies (540) can view sites based on their jurisdiction on the state level (State Agencies) or have access to all site within the USA (Federal Agencies); search criteria #4 is used—site attribute "state"

The system further allows larger organizations, such as wireless service providers, to manage their access to the database according to their internal organization structure. For example the system allows them to create multiple user accounts for their representatives and assign them access to sites by their region, state or county.

In one embodiment the interface with the site information is presented as a site top preview map—a site plot map—with all the site's elements based on the database data. Site top preview will be explained in details with connection to FIG. 10 Antenna structure pop-up window shows detailed information about the antenna including MPE horizontal view with buttons allowing the user to switch between antenna arrays, MPE map vertical view with buttons allowing the user to switch between antenna sectors, antenna structure camera views including both standard and close view options, and antenna structure information. In one embodiment antenna structure information can include the antenna structure type, latitude/longitude of the antenna structure, list of antenna arrays with labels and elevations, list of antenna sectors for all antenna arrays with labels and azimuths, and list of all antenna for one antenna sector with label, frequency, power, antenna type, and model.

In one embodiment the site information module 428 also allows the user to filter sites by power line types (high power lines, low power lines, restricted), print information related to RF safety for specific pole numbers, and create an interactive map. The interactive map function allows the user to 'move' along the power lines on an interactive map to locate another site on the same power line. The interactive map displays clickable arrows in the direction of the power line, a click on these arrows moves toward the location. The sites are shown by a dot; a click on a site dot displays information about the site.

Figure 6:
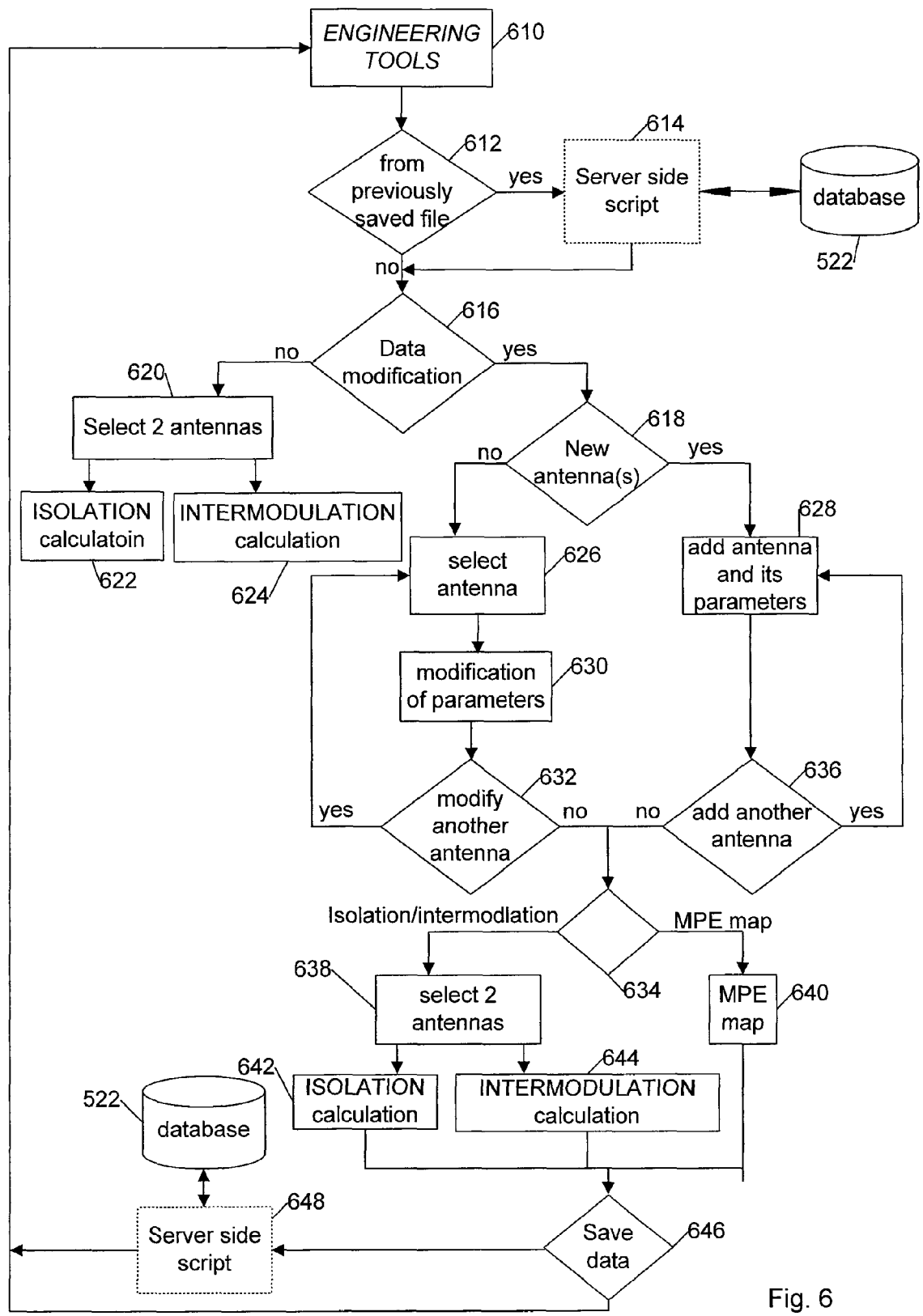
FIG. 6 is a flow diagram of one embodiment of the process implemented by the engineering tools module.

FIG. 6 is a flow diagram of one embodiment of the process implemented by the engineering tools module 436 of FIG. 4. In one embodiment functions of the engineering tools module include generating MPE maps based on modified data, calculating intermodulation between selected antennas, calculating isolation between selected antennas and the ability to create a "try-out" site. The "try-out" option provides the user with the ability to place hypothetical new antennas into an existing site, MPE maps and other calculations can then be performed.

Referring to FIG. 6 the user enters the engineering tools at step 610. At step 610 the user can choose a previously saved file or choose to create a new file, which in one embodiment could be a "try-out" site. If the user selects a previously saved file the process proceeds to step 614. At step 614 the information from the previously saved file is retrieved. In one embodiment this is accomplished by a query to the database 522.

Whether a previously saved file is retrieved or not, the process proceeds to step 616. At step 616 the user can select to analyze existing data or to modify data. If the user elects to use existing data, the process proceeds to step 620. At step 620 the System allows the user to select two antennas at the site. At step 622 the isolation between the antennas selected by the user in step 620 is calculated. At step 624 the intermodulation between the antennas selected by the user in step 620 is calculated.

If the user elects to modify the data at step 616, the method proceeds to step 618. At step 618 an interface provides the user with an option to choose new or existing antennas. If the user chooses the existing antenna option the process proceeds to step 626 which provides the user an option of selecting an antenna. At step 630 the System provides the user with the ability to modify the parameters of the antenna selected in step 626. Next the process provides the user with the ability to choose to modify another antenna at step 632 or proceed to the function steps. If the user chooses to modify another antenna the process returns to step 626. If the user chooses not to modify another antenna the process proceeds to step 634. If the user chooses a new antenna at step 618 the System proceeds to step 628. At step 628 the process provides the user with the ability to add (or create) an antenna and its antenna parameters.

In one embodiment the adding or creation of an antenna is performed by providing the user with lists of choices from a database. For example, the process can begin with a list of antennas and then proceed to the lists of characteristics associated with the selected antenna. The selections are stored in a file which represents the created antenna. Once the user is finished selecting the parameters for the antenna, the process proceeds to step 636. At step 636 the process provides the user with the ability to choose to add another antenna or proceed to the calculation steps. If the user chooses to add another antenna the process returns to step 628.

In one embodiment at step 634 an interface is transmitted which allows the user to choose to either perform isolation/intermodulation calculations or create an MPE map. If the user chooses isolation/intermodulation the process proceeds to step 638. At step 638 the process provides the user with the ability to select two antennas which includes my antennas created by the user. Once two antennas are selected, the process provides the user with the ability to proceed to either step 642 to calculate isolation between the two selected antennas or to step 644 to calculate intermodulation between the two selected antennas. If the user chooses the MPE map step, the process proceeds to step 640 where an MPE map is created based upon the characteristics of the antenna. At step 646 the calculations performed by the System or the MPE maps created can be saved. At step 648 the information is saved into the database 522.

Referring back to FIG. 5, at the site information step 536, or FIG. 4 module 428 the user can access the functions in the contacts module 437 shown in FIG. 4. The System provides the user with a contacts module. At step 536 of FIG. 5 the System provides the user the option to go to the power down request module 434 of FIG. 4.

Figure 7A:
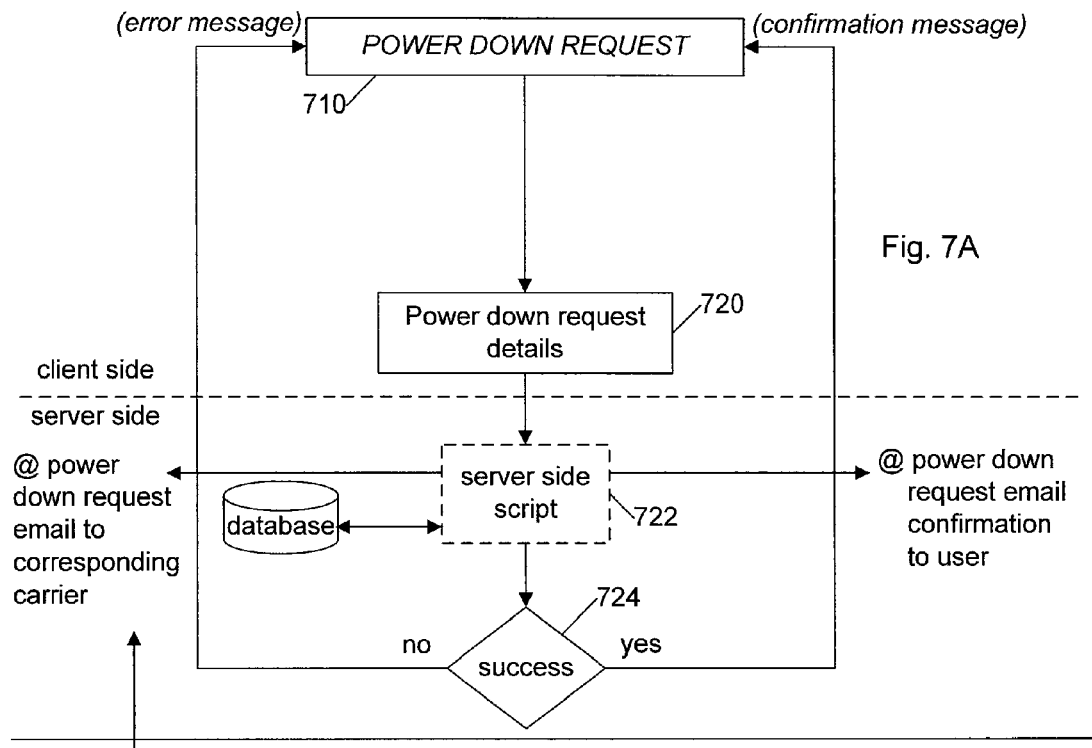
FIG. 7A is a flow diagram of the power down request functions.

FIG. 7A is a flow diagram of the power down request functions which can be implemented by modules 434 and 440 of FIG. 4. At step 710 a power down request interface provides the user with the ability to send a power down request for one or multiple antenna structures from a selected site. At step 720 the process provides the user with the ability to enter details relating to the power down request. At Step 722 a power down request email is generated and sent to the broadcaster associated with the antenna, and a confirmation email about sending the power down request is sent to the user, and then a database record about power down request is created. At step 724 if the power down is successful a screen is displayed at 710 stating the emails have been successfully sent.

Figure 7B:
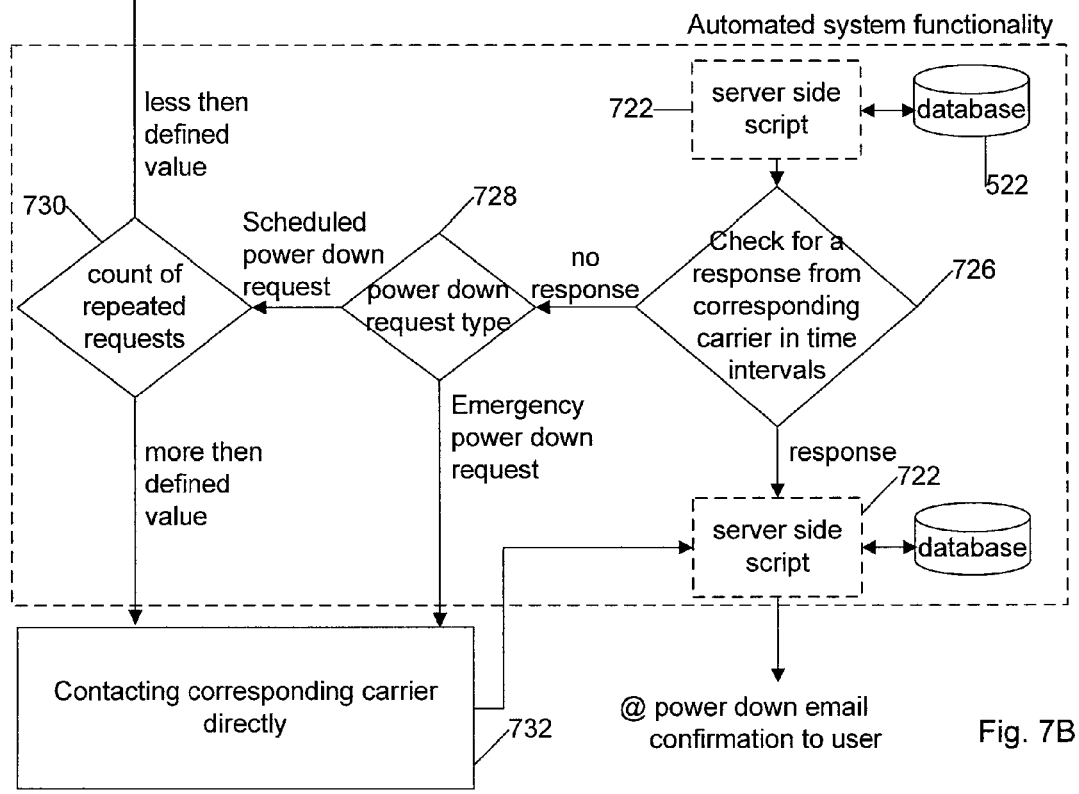
FIG. 7B is a flow diagram of the functions performed once a power down request is sent to the wireless telecommunications company.

FIG. 7B is a flow diagram of the functions performed once a power down request email is sent to the wireless telecommunications company. This request is sent automatically by database administration module 444 FIG. 4. At Step 726 at predetermined time intervals a check is carried out to determine if a response from the wireless telecommunication company has been received. If a response is received from the wireless telecommunication company the process proceeds to step 722. At step 722 the response is saved in the database. At step 722 a power down email confirmation is also sent to the user to confirm that the wireless telecommunication company received the power down request. This email may also contain further power down request information. If step 726 determines that no response has been received from the wireless telecommunication company the process proceeds to step 728. Step 728 determines what type of power down request has been sent. In one embodiment the types of power down requests include scheduled and emergency. If the power down request is determined to be an emergency the process proceeds to step 732. At Step 732 the system administrator contacts the wireless telecommunication company directly and notifies them that the antenna structure must be shut down. If the power down request is a scheduled power down the process proceeds to step 730. Step 730 determines the number of repeated power down requests which have been sent to the wireless telecommunication company. If step 730 determines that less than a defined value of repeated power down requests have been sent, step 730 sends another power down request email to the wireless telecommunication company. If step 730 determines that more than a defined value of repeated power down requests have been sent, the system proceeds to step 732. If the system administrator contacted the wireless telecommunication company successfully the system proceeds to step 722, as if the response was received from the wireless telecommunication company.

Figure 8:
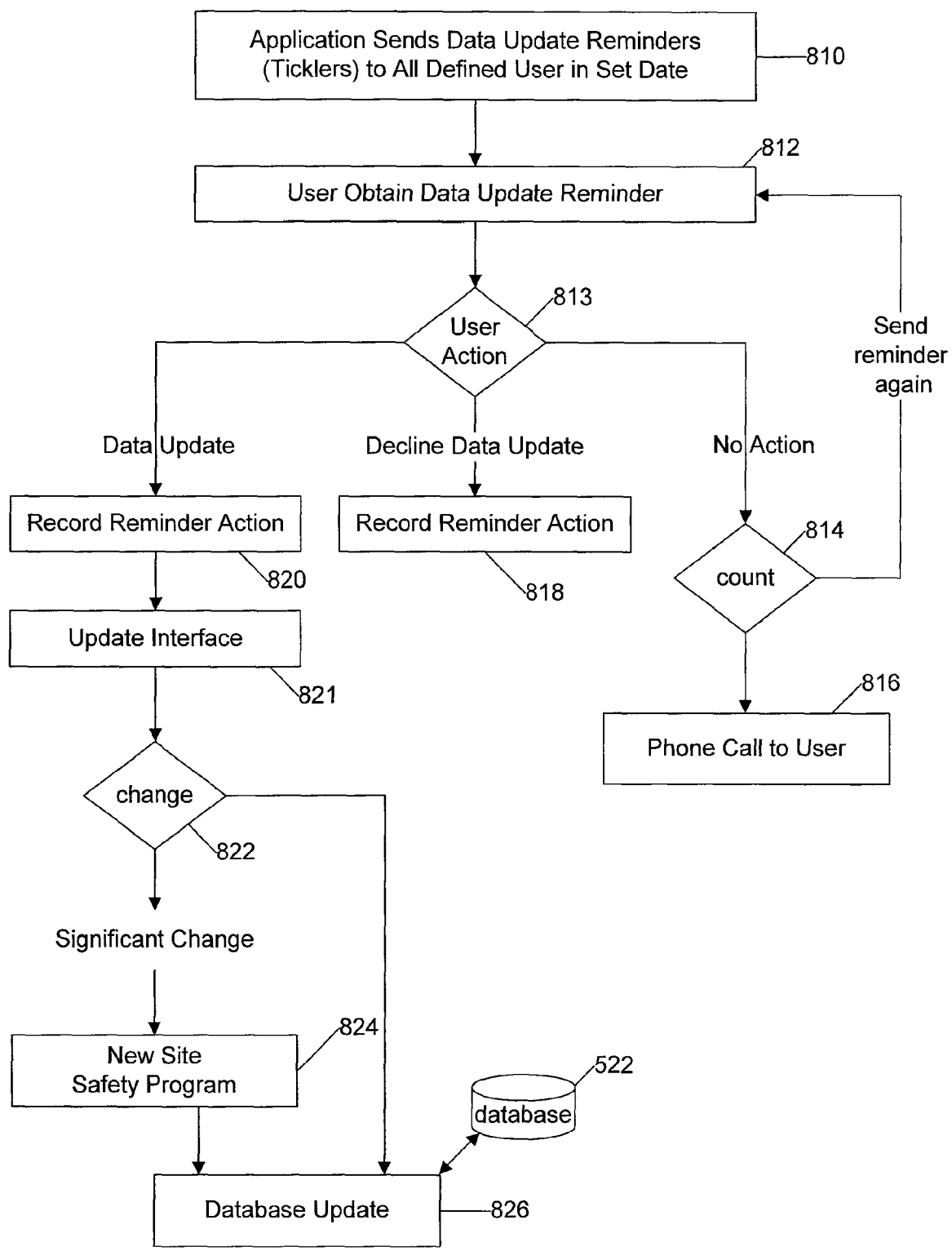
FIG. 8 is a flow diagram of one embodiment of the process implemented by the data update module.

FIG. 8 is a flow diagram of one embodiment of the process implemented by the data update administration module 447 of FIG. 4. At step 810 data update reminders are sent to all defined users. Defined users and their entered information is obtained from the user database and email reminders are transmitted to each such user. At step 812 the email displays a data update reminder to the user. At step 813 the user can select from action choices including data update or decline data update. If the user chooses the data update function the module routes them to step 820 where the user action, in this embodiment, database update, is "recorded", in the database. At step 821 the user is provided with an interface for making the update. In one embodiment this interface is made through module 432 of FIG. 4. The quality of the data is checked and the process continues to step 822 where the System verifies any significant change of the data that could affect site's specific safety program. If there is any significant change, a new site safety program is created by module 824. At step 826 the module stores the information, in the database. After receiving a response from the server side script, a screen displays information about success of update.

At step 813 if the user declines to update the data, the process proceeds to step 818. At step 818 the user's action, in this case decline the database update is "recorded" in the database. At step 813 if the user takes no action the process proceeds to step 814. At step 814 the process either sends a second reminder or generates a prompt for an administrator to contact the wireless telecommunication company by telephone or other means. This choice based on the number of times the process has received no action from the user.

Figure 9:
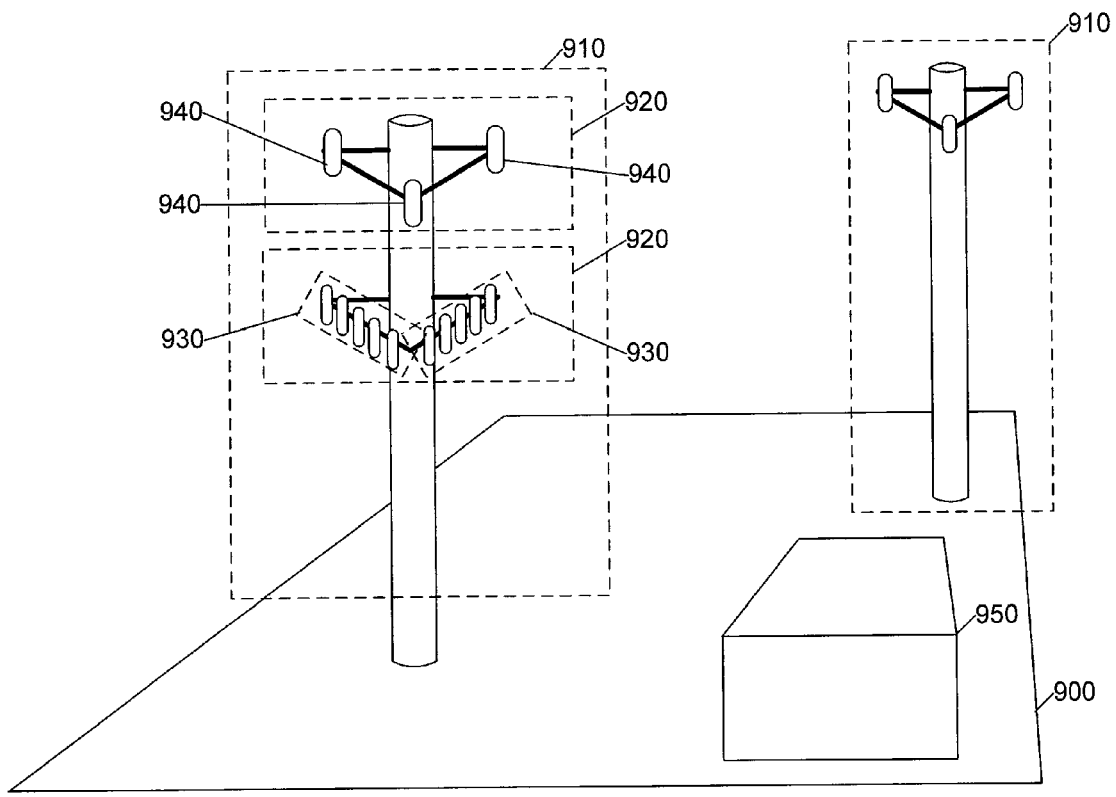
FIG. 9 is a graphical representation of a physical site related to a generalized site data structure.

FIG. 9 is a graphical representation of a physical site 900 and a generalized site data structure. FIG. 9 is intended to clarify the relationship between the data structure depicted more completely in FIG. 2 and a physical site that can be represented by the data structure. Each site 900 (represented as element 210 in the data structure) may include one or more (generally indicated by the notation "(n)") antenna structures 910 (represented as element 212 in the data structure). Each antenna structure may include one or more antenna systems 920 (represented as element 214 in the data structure) and each antenna structure may further include one or more groups of antennas 930 (represented as element 216 in the data structure). Each antenna group can include one or more antennas 940 (represented as element 218 in the data structure)

Figure 10:
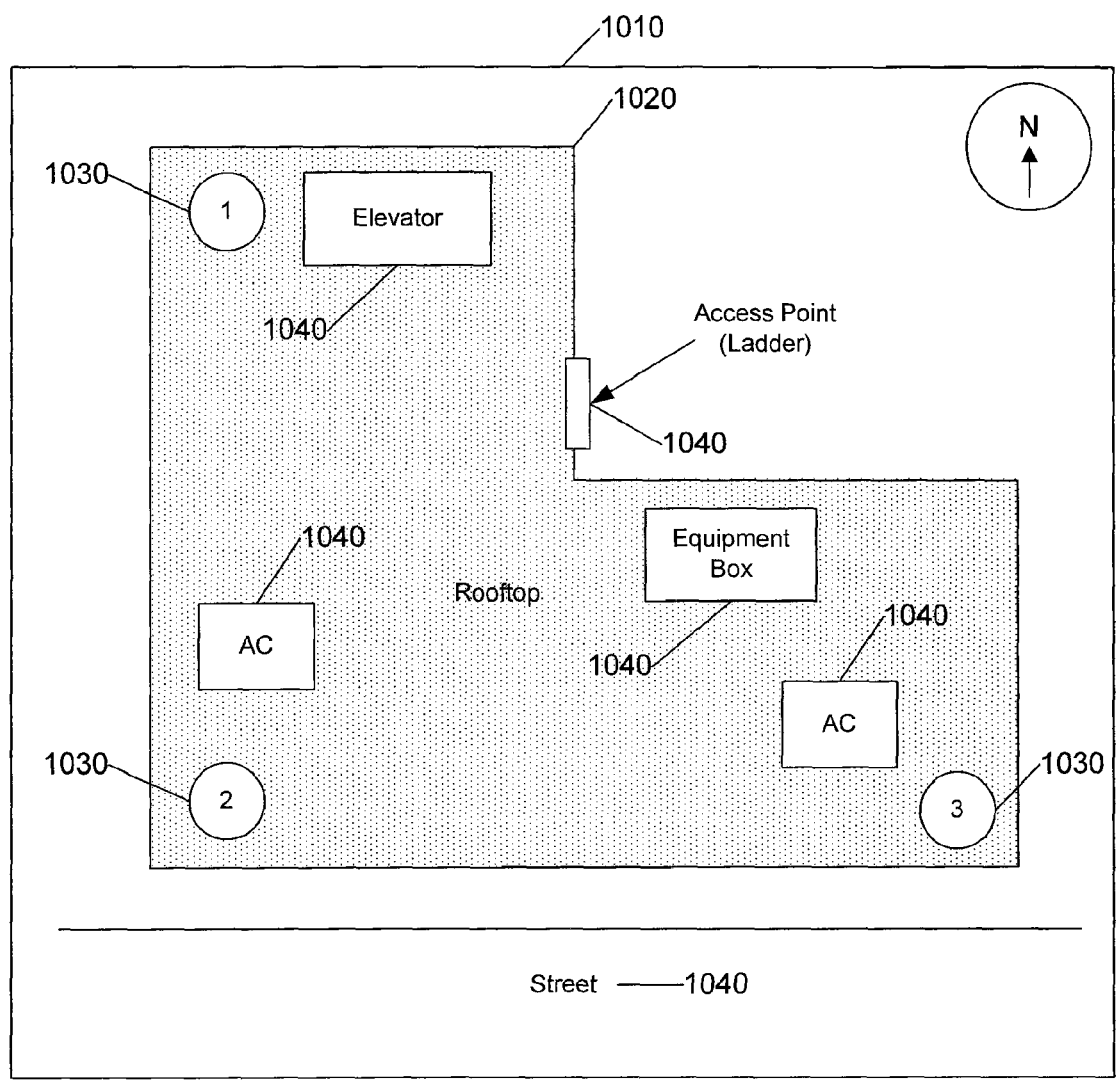
FIG. 10 is an example of site plot map—a graphic representation of the antenna structures and other site elements site plot view.

FIGS. 10, 11 and 12 will now be described in connection with one embodiment of a System used to define the spatial relationships between elements of a site.

FIG. 10 is a graphical representation of a system which can be employed to define the spatial relationships in a horizontal plane between multiple antenna structures at a site which are stored in the database and is used to create site plot map preview. In the example depicted in FIG. 10 three different antenna structures 1030 are located at one site. The Site plot map shows these antenna structures on the area that represents building rooftop 1020. Additionally non-RF elements 1040 are presented such as Air Condition (AC), equipment box, or access point.

FIG. 11 is a top view of antenna system's MPE map as presented by module 430 of FIG. 4. Antenna system MPE map 1110 includes antenna system identification 1120 and legend 1130 which includes a description of the graphic elements used for the MPE map. The MPE map includes a graphic representation of the antenna system 1170, non-RF elements 1140 and the controlled 1150 and restricted 1155 areas of the MPE maps including dimensions 1160 as required by the Site-specific Antenna Safety Program.

FIG. 12 is a side view of the antenna system's MPE map as presented by module 430 of FIG. 4. Antenna system MPE map 1210 includes an antenna system identification 1220 and legend 1230 which includes the description of the graphic elements used for MPE map. The MPE map includes a graphic representation of the antenna system 1270, non-RF elements 1240 and the controlled 1250 and restricted 1255 areas of the MPE maps including dimensions 1260 as required by the Site-specific Antenna Safety Program.

The MPE maps module 430 calculates power densities for antennas in the database and creates graphic representations of the power densities. Example representations are depicted in FIGS. 13 and 14 described below. In one embodiment, the graphic representations are in the form of radiation pattern maps. In one embodiment the radiation pattern maps graphically depict the power densities and physical landmarks, for example towers and emitters. The calculations of power density and the creation of graphic representations of the densities can be used to determine and maintain site safety and to comply with government regulations (e.g., OSHA and FCC regulations) and to comply with other safety standards.

The graphic representations of the MPE maps provide the user with projected gradation patterns of power density. In one embodiment, the maps show two distinct areas, restricted and controlled MPE areas, which are defined in one example by FCC/OSHA standards. MPE maps for the controlled areas represent the areas where the power density of the RF fields exceeds the limits for the general population. MPE maps for the restricted areas represent the areas where the power density of the RF fields exceeds the occupational MPE limits. The power density in the controlled areas is above the general public limits but not above the occupational limits for RF trained workers. However, more than two areas or regions can be defined and displayed. In general, the MPE maps module can display various gradation distinctions based on selected density values. The power densities created by multiple antenna structures in some instances owned by different wireless telecommunication companies can be generated to show cumulative density. Alternatively, these modules can be used to calculate all power densities for a site. This is extremely beneficial if a person needs to do maintenance at a site so that they can determine how far from each antenna structure they must remain in order to be at a safe distance.

Figure 15:
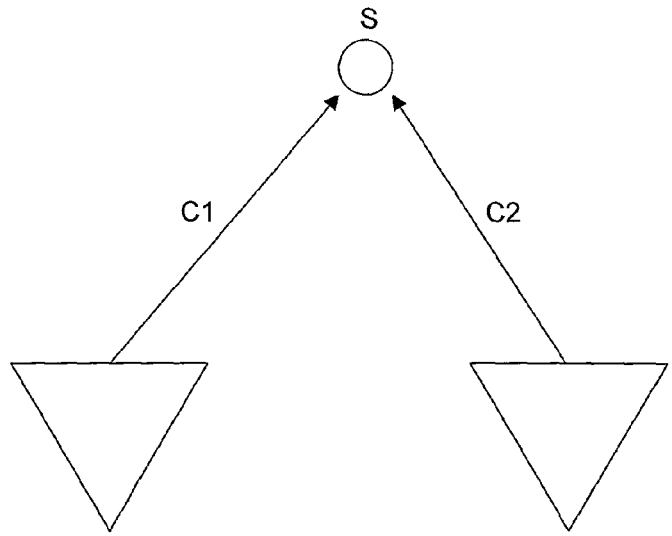
FIG. 15 represents the power density as a contribution of two antenna radiations.
Figure 17:
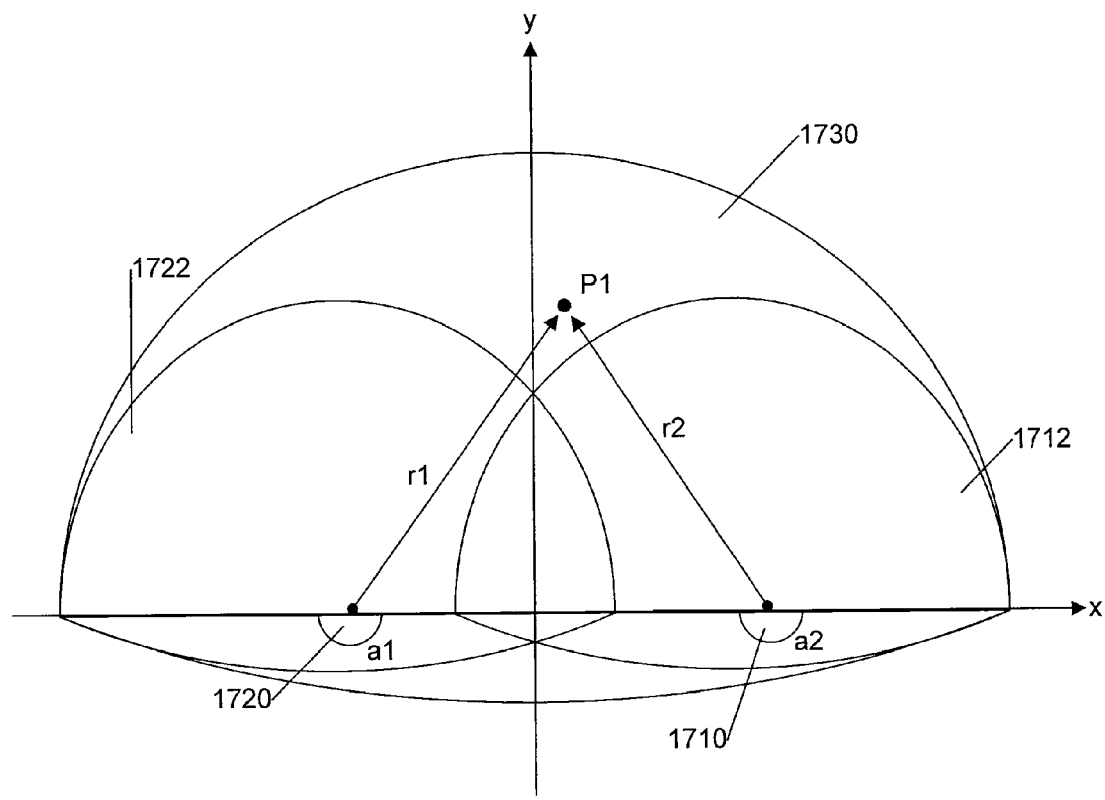
FIG. 17 represents the power density contribution of two antennas to a point in space.
Figure 18:
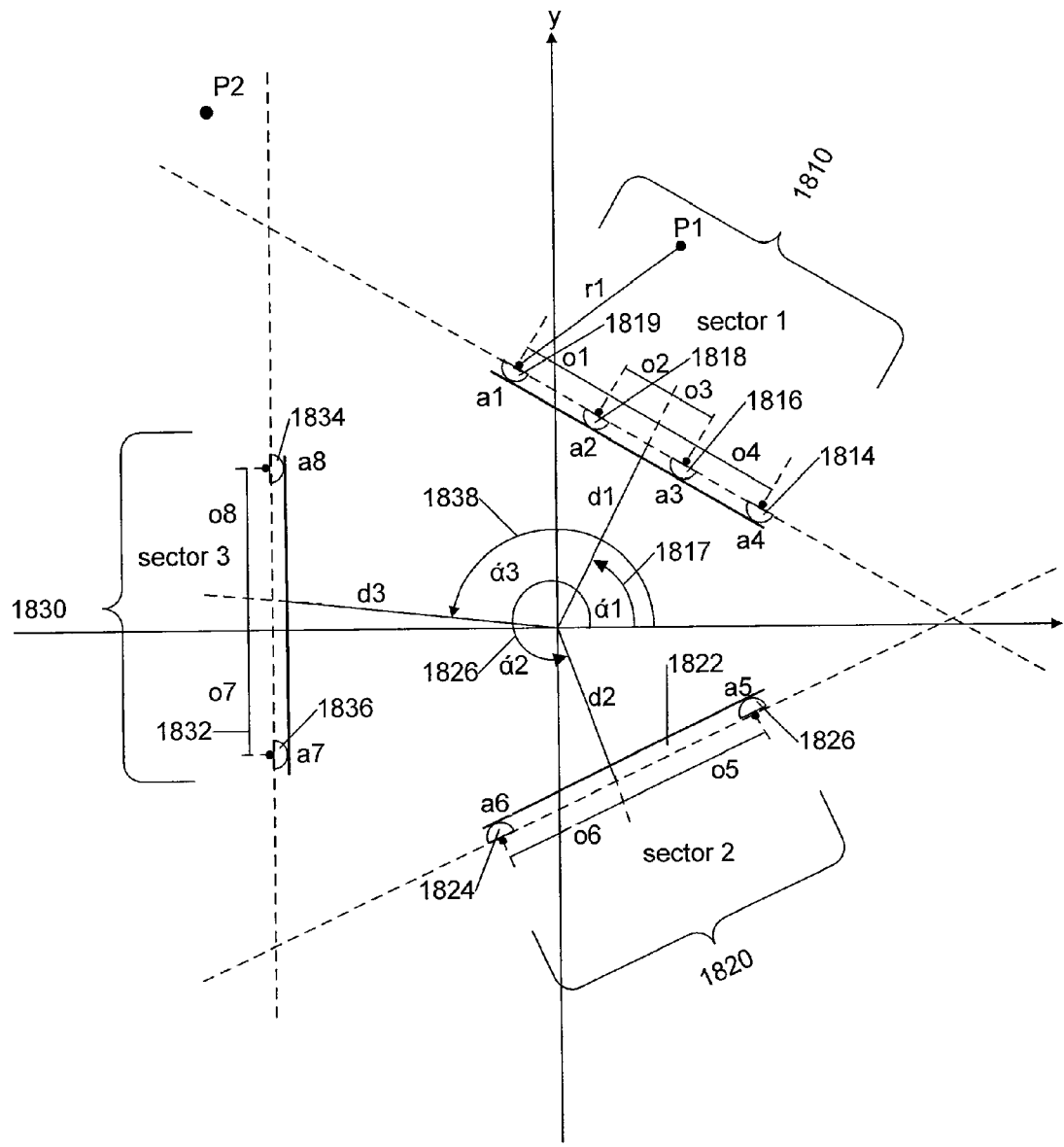
FIG. 18 represents participation of multiple antennas in the contribution model applied to an antenna array.

In one embodiment the MPE maps graphic representations and the power density calculations for antenna structures with multiple antennas can be determined using a single antenna model (FIG. 13B), conservative model (13 A) or the contribution model (FIGS. 15, 17 and 18). The conservative model considers one antenna sector as one antenna with power equal to the sum of the power of all antennas in the sector. The conservative model can be used in situations where it is not possible to calculate the individual contribution of the antennas and where it is not certain if the antennas are used as a transmitter or receiver. The contribution model creates a more accurate graphic representation of the MPE maps by calculating the contribution of each of the antennas in the sector.

Some example equations used to calculate power density which can be used for MPE maps are set forth below. In one embodiment the MPE map module 430 FIG. 4 can calculate power density for a variety of different antennas through the use of applicable mathematical models which have been enhanced by field measurement results stored in the data base.

The following calculations can be used to predict power density levels around typical RF sources.

$$S = \frac{P \cdot G}{4\pi R^2} \qquad 1$$

$$S = \frac{EIRP}{4\pi R^2} \qquad 2$$

where:
S=power density
P=power input to the antenna
G=numeric power gain of the antenna in the direction of interest relative to an isotropic radiator
R=distance to the center of radiation of the antenna
EIRP=equivalent (or effective) isotropically radiated power For prediction of power density near a reflective surface, a 100% reflection of incoming radiation can be assumed, resulting in a potential doubling of predicted field strength and a four-fold increase in power density. In that case Equations (1) and (2) can be modified to:

$$S = \frac{(2)^2 P \cdot G}{4\pi R^2} = \frac{P \cdot G}{\pi R^2} = \frac{EIRP}{\pi R^2} \qquad 3$$

The equations (1), (2), and (3) are generally accurate in the far-field of an antenna but will over-predict power density in the near field, where they could be used for making a "worst case" or conservative prediction. Following equation can be used to predict power density close to antenna surface $$S = \left(\frac{180}{\theta_{BW}}\right)\frac{P_{net}}{\pi R h} \qquad 4$$

where:
S=power density
$P_{net}$=net power input to the antenna
$\theta_{BW}$=beam width of the antenna in degrees
R=distance from the antenna
h=aperture height of the antenna
Equation (4) can be used for any vertical collinear antenna including omni-directional antennas where OBW would be 360 degrees.

The MPE maps module 436 as represented in FIG. 4 provides radiation pattern maps which show the power density limits for restricted, controlled and general public MPE boundaries. The radiation pattern maps depicted in FIGS. 13 and 14 show two different levels of density based on the exposure limit ranges set forth in the following tables:

| Frequency Range (MHz) | Power Density (S) mW/cm² |
|---|---|
| Controlled Exposure (limits for occupational) | |
| 30-300 | 1.0 |
| 300-1,500 | f/300 |
| 1,500-100,000 | 5.0 |
| General Public Exposure (limits for general population) | |
| 30-300 | 0.2 |
| 300-1,500 | f/1500 |
| 1,500-100,000 | 1.0 |

Figure 13A:
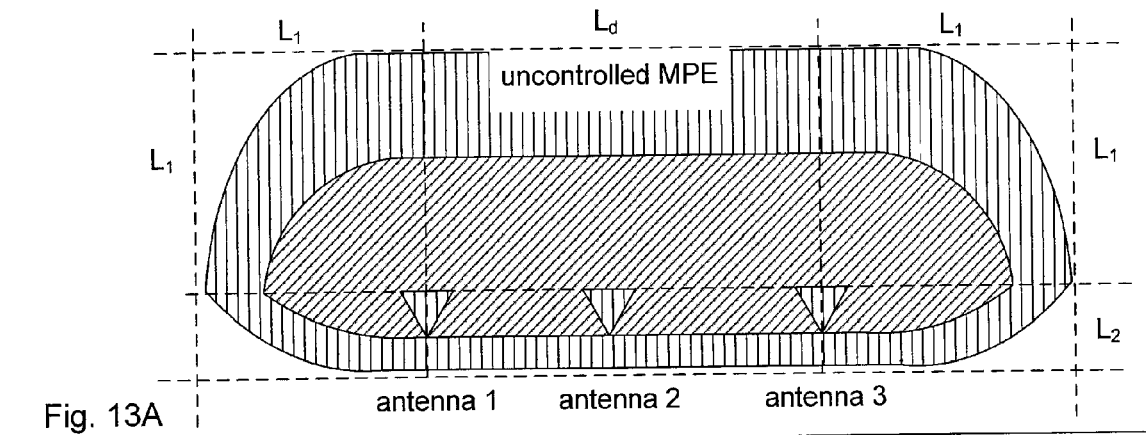
FIG. 13A is a graphical representation of a MPE map from the top view perspective for three antennas with overlapping controlled and restricted areas represented.
Figure 13B:
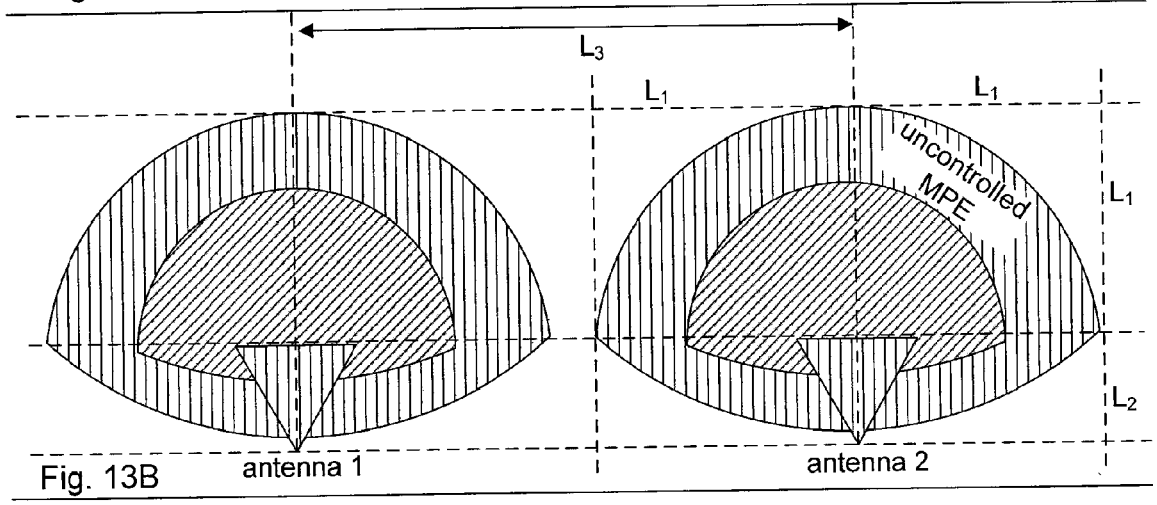
FIG. 13B is a graphical representation of a MPE map from the top view perspective for two antennas with non-overlapping controlled and restricted areas represented.
Figure 13C:
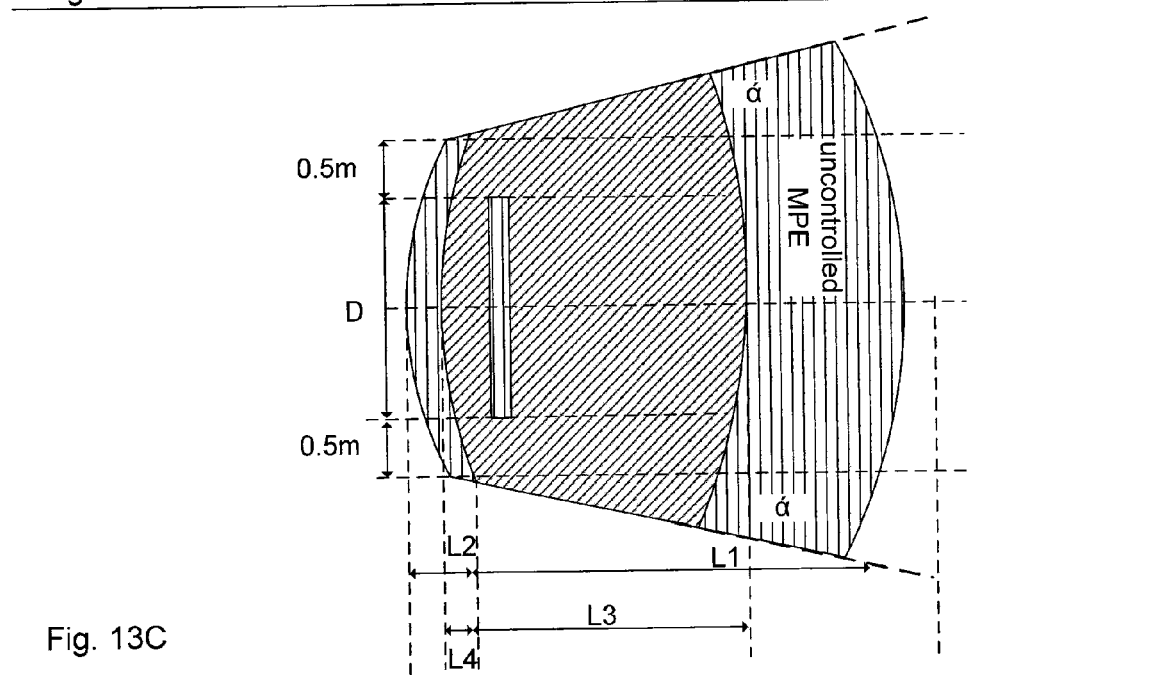
FIG. 13C is a graphical representation of a MPE map from the side view perspective of an antenna.

13A is a graphical representation of a MPE map from the top view perspective for three antennas with overlapping controlled and restricted areas represented. In one embodiment, these gradations include the occupational RF "restricted" and "controlled" areas based on the MPE limits. FIG. 13A is a top view for three antennas or transmitters with overlapping controlled and restricted MPE regions. FIG. 13B is a graphical representation of a MPE map from the top view perspective for two antennas with non-overlapping controlled and restricted areas represented, and where a single antenna mathematical model was applied. FIG. 13C is an example of a side view of an antenna as represented in FIG. 13A or 13B. In these figures, L1 is the extent of the controlled areas which is the distance in which power density reaches its limits for general public MPE. L2 is the extent of the controlled area on the back of the beam and equals L1 multiplied by the front-to-back FB ratio from database table antenna model 260. The front-to-back ratio stored in the database table 260 is obtained from the manufacturer's technical specification. L3 is the distance in which the power density reaches its limits for controlled MPE. L4=L3 multiplied by the front-to-back ratio. Ld is the distance between the center of the antennas furthest apart. D is the height of the antenna.

Figure 14:
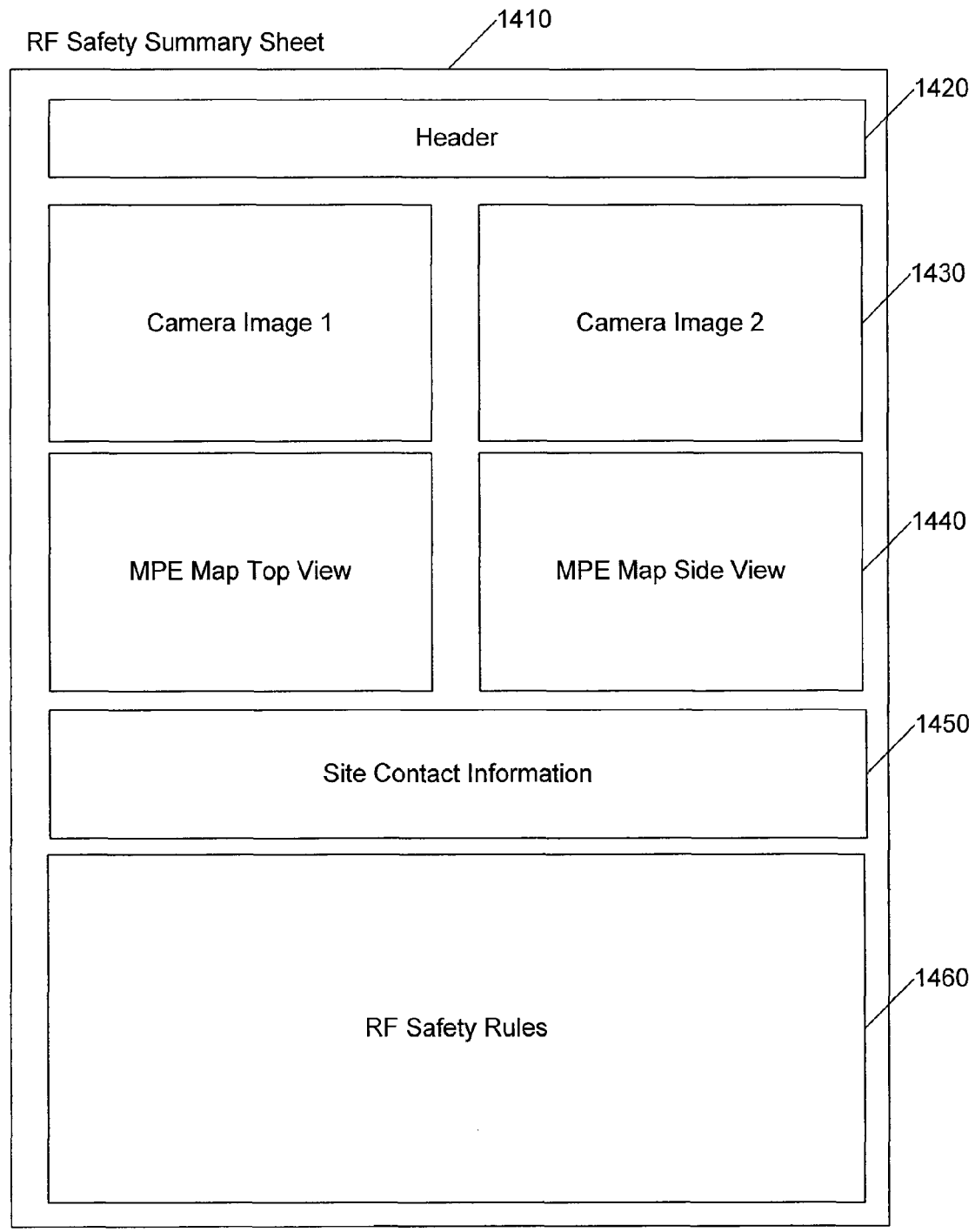
FIG. 14 is a block diagram representation of the RF safety summary sheet.

FIG. 14 is a block diagram representation of the data included in the RF Safety Summary Sheet (RF SSS) presented in the system by module 431 of FIG. 4. RF Safety Summary Sheet 1410 includes Header 1420 that identifies the site and the version of RF SSS; Camera images 1430; MPE maps 1440; site contact information 1450 such as property owner representative or licensee; and RF Safety Rules 1460 that describes in details rules that worker has to follow. The information allows the system to provide safety information that is specific to each site.

FIG. 15 represents the power density which is created as a contribution of two antennas. C1 represents the contribution from antenna 1, C2 represents the contribution from antenna 2 and S is the power density at a particular point. Power density S is calculated as the contribution of the power densities of antennas 1 and 2, expressed as a percentage of the exposure limit. The graphic representation is based on calculations of the contributions of all the involved antennas in the site. The calculations for the percent contributions of antenna 1 and antenna 2 are set forth in Equations 6 and 7 below.

$$C1 = \frac{S_1}{S_1 stnd} \qquad 6$$

$$C2 = \frac{S_2}{S_2 stnd} \qquad 7$$

Where:
$S_1$=power density of antenna 1
$S_{1stnd}$=exposure limit of antenna 1
$S_2$=power density of antenna 2
$S_{2stnd}$=exposure limit of antenna 2

The known variables in these equations are the position of the antennas in two dimensional space based on an X and Y coordinate system set forth in FIG. 10 and FIG. 12, and the limit of the power density, for example, as defined by a governmental regulation.

Figure 16:
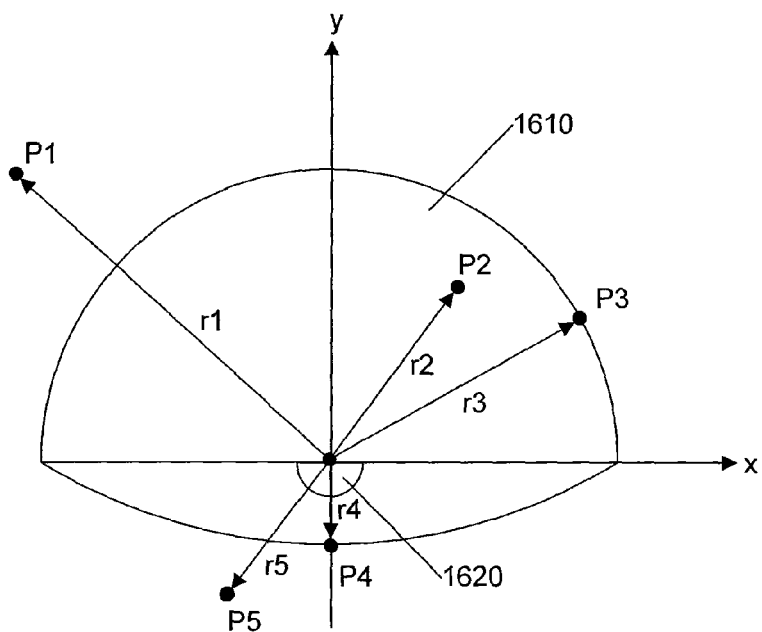
FIG. 16 represents the power density of a single antenna in different points in space.

FIG. 16 represents the power density of a single antenna in different points in space. The point at P1 has a power density under the limit beyond the MPE boundaries. The point P2 has a power density above the limits which falls within the MPE boundaries. The point P3 falls on the outer edge of the MPE boundaries and has a power density equal to the limit, referred to as the limit point. Point P4 is at a distance r4 from the antenna and r4=front-to-back ratio multiplied by r3. The antenna 1620 has a front-to-back ration of 10% and therefore P4 has a power density equal to the limit as does P3. Point P5 is located outside of the antenna's rear radiation MPE boundary.

In order to calculate the power densities for such a site with more than one more antenna structure, the standard MPE limits calculations need to be modified in order to generate cumulative radiation patterns which include the contribution of all the individual antennas. To calculate the power density at certain point in the P1 and determine whether it exceeds acceptable limits, the total sum of individual contributions of the various antenna at the site need to be calculated. $P_c$ is the calculation used to determine whether the power density at a particular site is below or in excess of acceptable limits. If $p_c$ is greater than 1, the power density is above acceptable limits. If $P_c$ is less than 1, then the power density is within acceptable limits. In order to calculate $p_c$, equation 8 set forth below is used.

$$p_c = \frac{pa1}{ps1} + \frac{pa2}{ps2} + \ldots + \frac{pa_n}{ps_n} \qquad 8$$

Where:
pa1=is actual power density based on r1 (distance from center of the antenna) and antenna power
ps1=is known limit for antenna a1
pc=number that expresses if the power density reaches its limit With this calculation the values obtained from each antenna at a site are added together to determine if the power at the particular point in space exceeds the MPE limits. Even if individual radiations at a particular antenna does not reach the MPE limits, the final radiation as a contribution of all antennas may reach the MPE limits. It is important to note that power density limits for individual antennas could be different for each antenna.

FIG. 17 represents the power density contribution of two antennas to a point in space. It is a diagram which represents the power density contribution of two antennas 1710 and 1720 to a point in space labeled P1. The individual radiation pattern map of antenna 1710 is shown at 1712 and the individual radiation pattern map of antenna 1720 is shown at 1722. The combined radiation pattern map for both antennas is represented by 1730.

FIG. 18 is a diagram which represents the participation of multiple antennas in the contribution model applied to an antenna array. There are three sectors represented in FIG. 18 being 1810, 1820 and 1830. The points labeled P1 and P2 are used to discuss power density at those points in two dimensional space in a contribution model. The power density at P1 is affected by antenna 1 (1819), antenna 2 (1818), antenna 3 (1816) and antenna 4 (1814) at sector 1810. All of the antennas on sector 1810 contribute to the power density at P1. The power density at P2 is affected by antennas 1819, 1818, 1816, 1814 of sector 1810 and antennas 1834 and 1836 of sector 1830. P2 is within the area where possible contributions of sector 1830 and sector 1810 overlap and therefore the power contributed by antennas on both sectors are taken into account.

Figure 19:
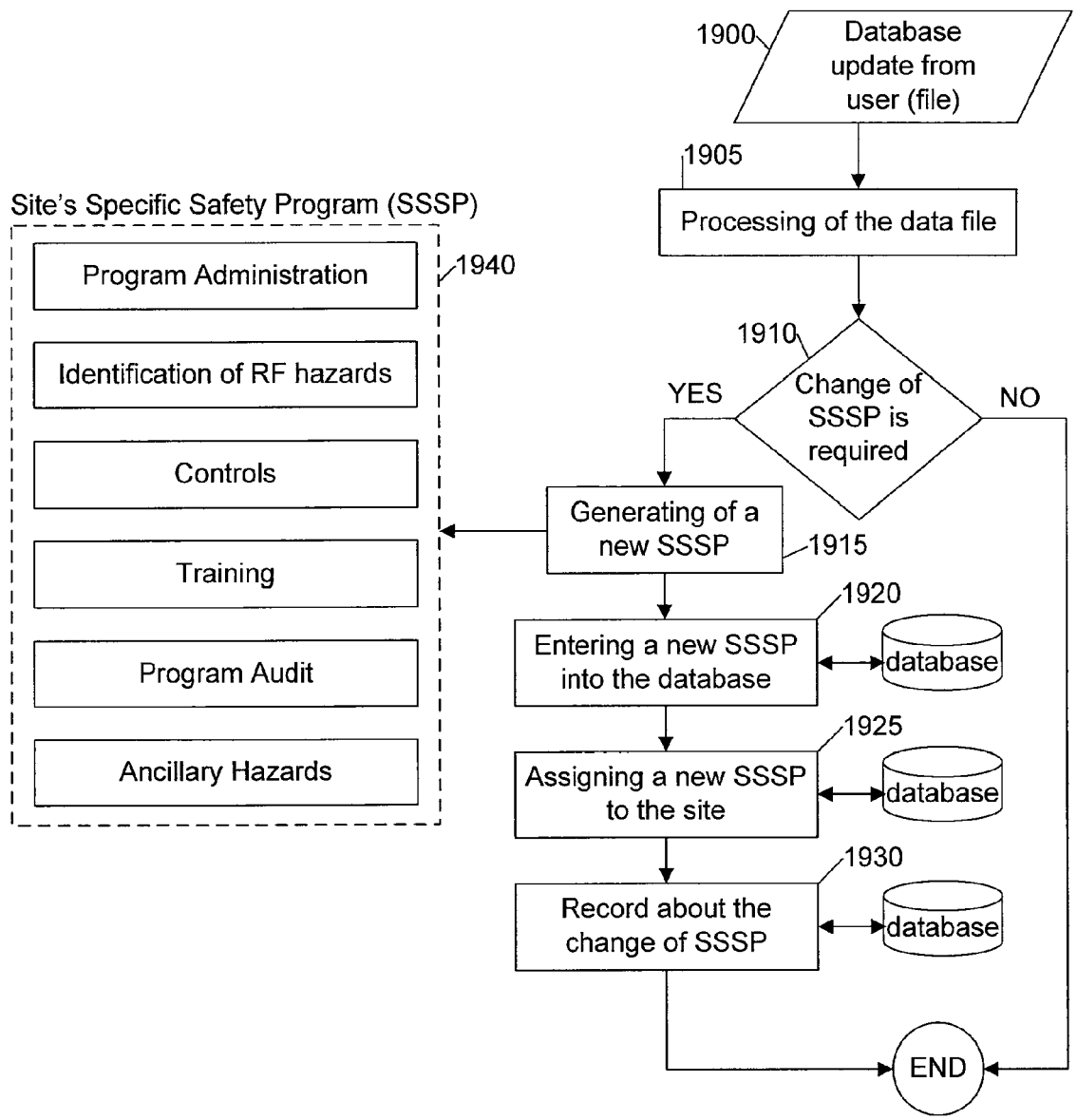
FIG. 19 is a flow diagram of one embodiment of an automated safety audit program.

FIG. 19 is a flow diagram of one embodiment of an Automated Safety Audit Program of FIG. 4. Site specific safety program module 433 of FIG. 4 provides user access to a site specific safety program (SSSP) which includes the site specific RF Safety Summary Sheet. One embodiment of a SSSP as depicted in FIG. 19 contains the following categories of information:

"program administration" which includes policies, RF safety officer information, contacts and documentation;

"identification of RF hazards" which identifies RF sources and MPE maps for the site "controls" which includes energy controls, signs to look for, safe work practices, RF monitoring, and personnel protective practices;

"training" which includes training programs for general public workers in areas where RF energy is too low to cause exposure above public limits, for workers in areas where energy may cause exposure above public limits, and for workers in areas where RF may cause exposure in excess of occupational limits unless workers utilize special controls and records of who has received the training;

"program audit" which contains information regarding responsibilities and audit reports; and "ancillary hazards" including fall protection, lockout agent, and extreme weather precautions see. The data for the SSSP is contained in the database (see FIG. 2A table 214).

Automated safety audit program updates a site's safety program when relevant changes are made at the site.

Referring to FIG. 19 automated safety audit program processes the database update file from the user at step 1900. In one embodiment, the update data file includes an array of keys and values, where 'key' is the identification of the columns in the database and 'value' is an updated value. If the file does not include a key for the particular database column, the process considers that the value was not changed and the current value is used if the site specific safety program (SSSP) (or the RF Safety Summary Sheet) needs to be changed. If new data is entered, the process proceeds to step 1905. At step 1905 the data entered by the user is processed by the System. The process determines if the updated values effect the existing SSSP, or if data directly include values that need to be changed in the SSSP. The following are examples of this process.

Example 1: If the input power of the transmitter is changed, this will change the location of the MPE boundaries. The MPE limits would then need to be recalculated and the existing SSSP would need to be changed. A new or modified SSSP would then be generated to replace the existing one.

Example 2: If the data update file includes a new site's RF safety officer, the information for the RF safety officer would need to be changed and a new SSSP would then be generated to replace the existing one.

Example 3: If the broadcasting frequency was changed, but it doesn't affect any part of the existing SSSP, then a new SSSP will not be generated.

At step 1910 if no change to the SSSP is required the process ends. However, if a change to the SSSP is required the process proceeds to step 1915 where a new or modified SSSP is generated. Once a new SSSP is generated, the system proceeds to step 1920 where the new SSSP is entered into the database. At step 1925 the new SSSP is given a unique id and assigned to the site. At step 1930 the process records the SSSP id change in the database. This record includes data on the old SSSP id, the new SSSP id, and the site identification code as seen in table 210 and 214 of FIG. 2A.

Though the foregoing description focused on the SSSP, it should be noted that the process also applies to the site specific RF Safety Summary Sheet. Additionally, if the RF Safety Summary Sheet is updated during the process, previously issued site specific certifications are indicated as invalid in the database. Additionally, such an update to the RF Safety Summary Sheet can trigger the process described below in connection with FIG. 24 where the system prompts a user to obtain a certification (in this case a re-certification). Notices can also be sent by the system to registered users that have received the site specific RF Safety Summary Sheet informing them that the old sheet is no longer valid.

Figure 20:
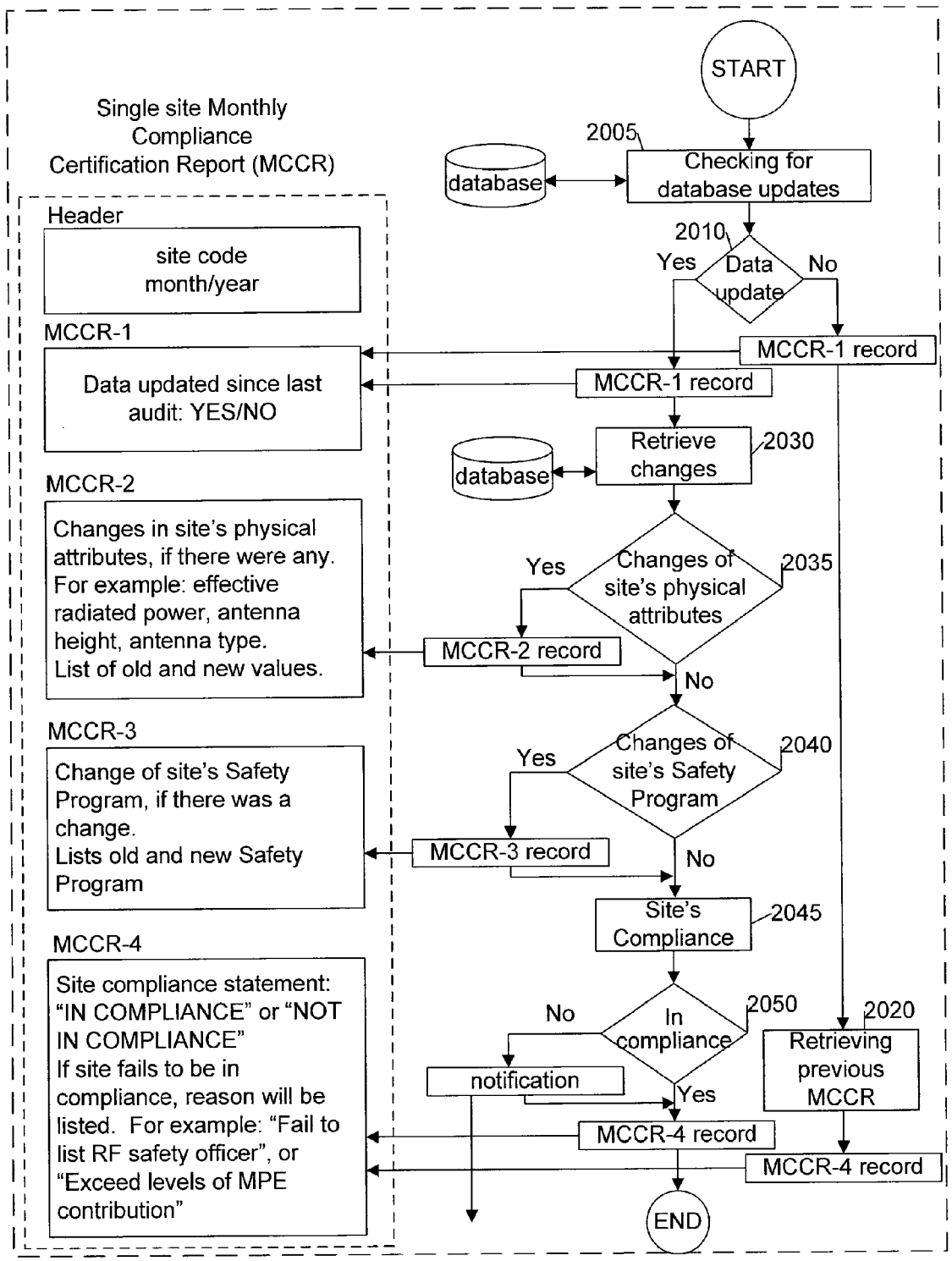
FIGS. 20 and 21 are flow diagrams of one embodiment of the automated compliance audit program.
Figure 21:
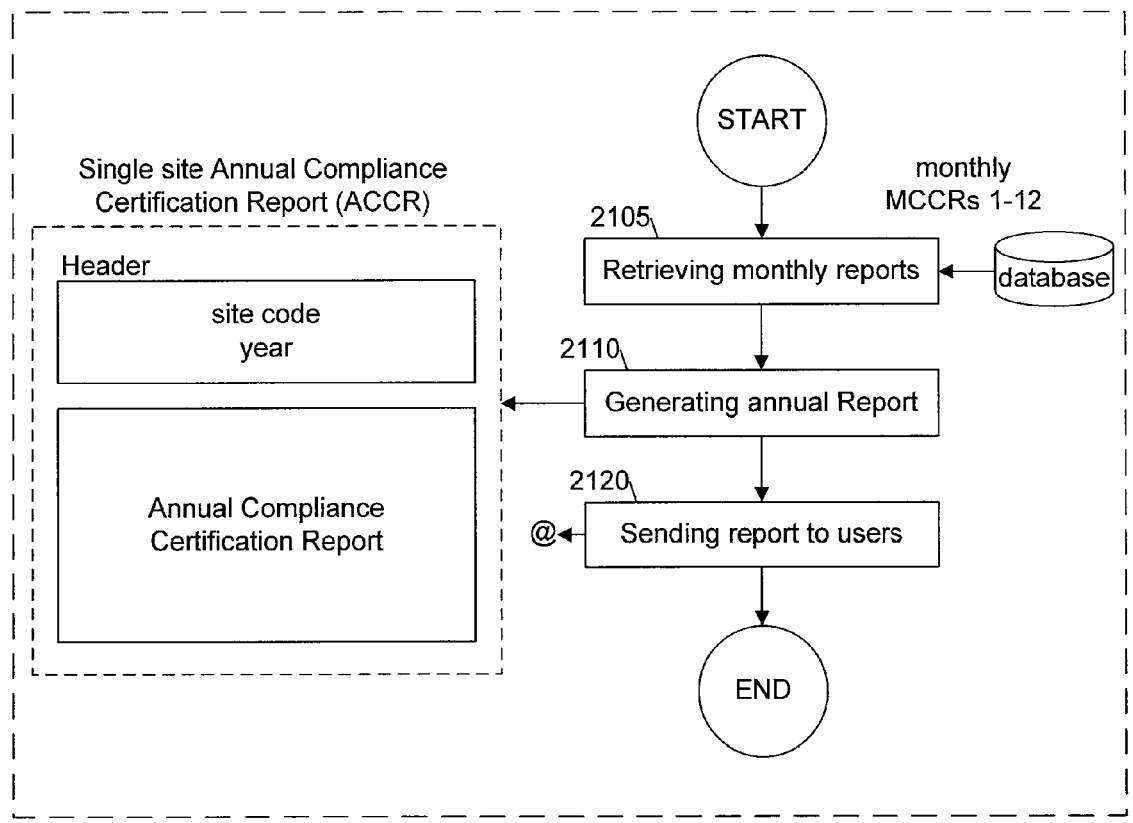

FIGS. 20 and 21 are flow diagrams of one embodiment of an automated compliance audit program (ACAP) implemented by the automated compliance audit module 446 of FIG. 4. The System executes a periodic, for example, monthly, ACAP for every site and creates and stores a monthly compliance certificate report (MCCR) as shown in FIG. 20. In one embodiment the MCCR includes the site code and the date (header), indicates whether the data has been updated since the last audit (MCCR-1), indicates what changes were made to the site since the last audit (MCCR-2), lists both the old and new safety programs if a new program was created (MCCR-3) and states whether the site is in compliance (MCCR-4). If the site is not in compliance the System sends a notification to the appropriate party. The System can also execute an annual compliance certificate report ("ACCR") for all users and the sites they manage. The ACCR reports can be automatically generated and sent to the users as seen in FIG. 21. The MCCRs and the ACCRs are generated as computer records and/or printed. The computer records are time stamped and encrypted so that they cannot be altered. These reports are designed to meet the requirements of all applicable regulations, such as international, Federal and State regulations.

Referring to FIG. 20 at step 2005 the process checks the database for any new data updates since the last audit. At step 2010 if no data updates are found, the System generates an MCCR-1 record indicating that no changes have occurred. The process proceeds to step 2020 where the previous MCCR is retrieved. The MCCR is updated monthly and used in the final site compliance statement MCCR-4. The process determines whether the site is in compliance with the current regulations applicable to that site. The System includes all applicable regulations. The System can also determine which regulations apply to the site. Whether the site is in compliance is then added to the MCCR. If the site is not in compliance, the reason for the non-compliance is added to the MCCR and notification is sent to the appropriate party. For example the reason could be "failure to list RF safety officer" or "exceeds the MPE limits". Finally, the MCCR record is time stamped and encrypted so that it cannot be altered.

At step 2010 if updated data is found, the process proceeds to step 2030. At step 2030 the process retrieves data changes from the database. At step 2035 the process determines if the data changes relate to the site's physical attributes, for example effective radiated power, antenna height, antenna type. If the changes relate to the sites physical attributes, the process generates a list of old and new values which are stored in the MCCR and the process proceeds to step 2040. If the changes don't relate to the sites physical attributes the process proceeds to step 2040. At step 2040 the process verifies any change in the site specific safety program (or the RF Safety Summary Sheet) since the last MCCR. If a change occurred the System creates an MCCR record that lists the old and new site safety program and the process proceeds to step 2045. At step 2045 the System analyzes updated data and determines if the site is in compliance with the applicable regulations. At step 2050, if the site is in compliance, the System creates site compliance statement MCCR-4 which states "IN COMPLIANCE" and ends the process. If the site is not in compliance, the System sends notification to appropriate party, creates a site compliance statement MCCR-4 which states "NOT IN COMPLIANCE", describes the reasons for the non-compliance and ends the process.

Referring to FIG. 21 at step 2105 the process retrieves the MCCR's from the database for the site being audited. At step 2110 an ACCR is generated by compiling all of the data from the MCCR's. The ACCR contains a site code year and an annual compliance certificate report. At step 2120 the ACCR is time stamped, encrypted and stored in the database. Additionally, a copy of the ACCR can be sent to the user associated with the site.

Figure 22:
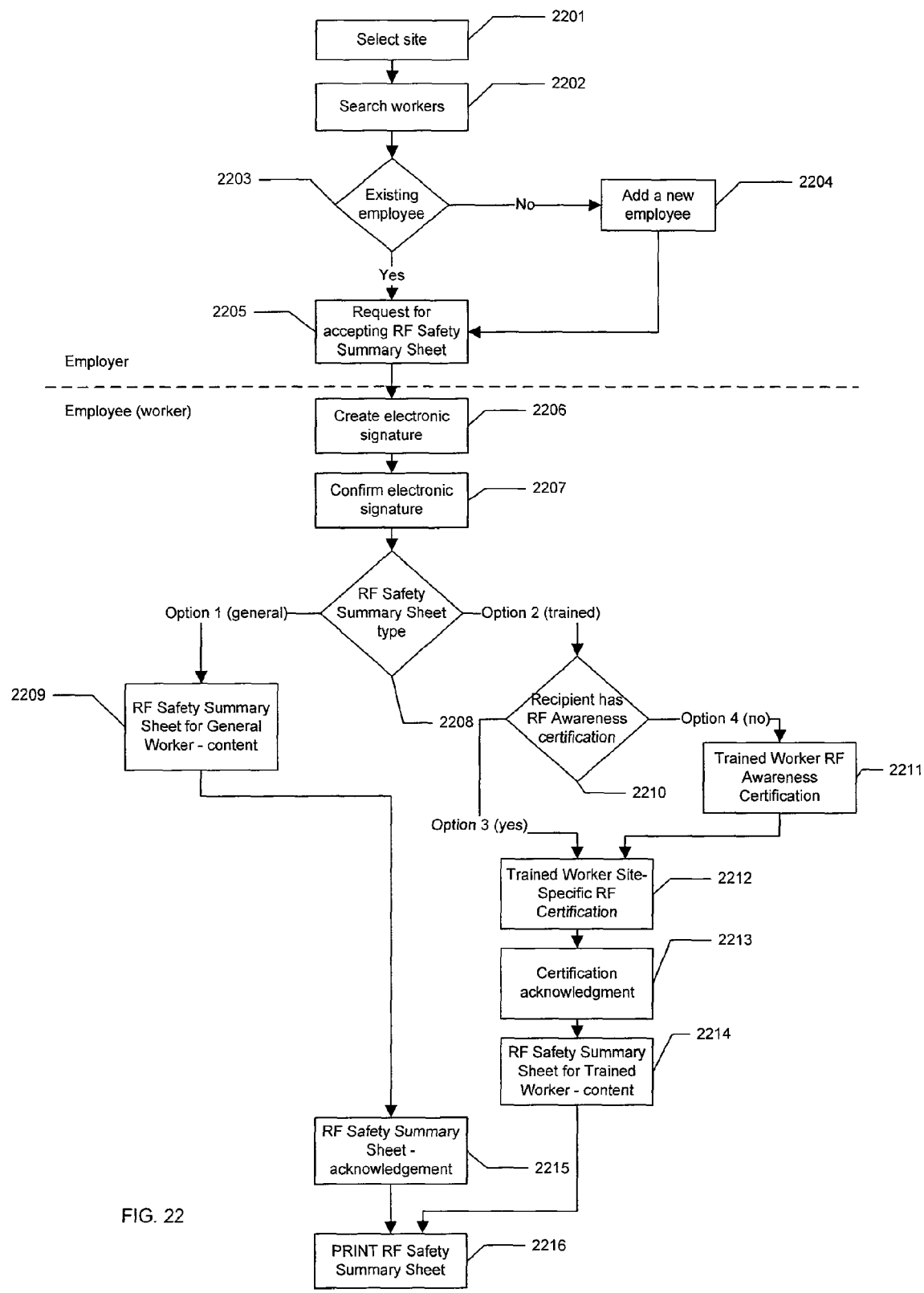
FIG. 22 is a flow diagram of functionality provided by the RF certification module 429 of FIG. 4 which allows an employer to provide his employee with site-specific RF safety summary sheets.

FIG. 22 is a flow diagram of functionality provided by the RF certification module 429 of FIG. 4. A user can access the module via the site information display as was mentioned above. The module allows a user to search for any worker listed in the database or only those workers that have received RF Certification step 2202. In one embodiment, the user's search is limited to employees of the user's company or organization. If the search does not present the desired employee (step 2203), the system allows the user to add a new employee to the database at step 2204. The system also provides the ability to issue the appropriate Site Specific RF safety summary sheet to either type of worker (new or existing) beginning with the request sent by employer to his employee at step 2205.

In one embodiment, the module presents all RF trained workers (employees) for the selected site at step 2202. To be qualified, the employee must have a current Worker RF Awareness Certification (e.g., certification date is equal to or less than one year old). Additionally, if the User requests general workers, the system will present all employees that do not have a current Worker RF Awareness Certification but have acknowledged the Site Specific RF safety summary sheet (acknowledgement date is equal to or less than one year old). If the database indicates that the candidate (worker) has acknowledged the receipt of the current Site Specific RF safety summary sheet for Certified Worker, the acknowledgement date will be presented. The system determines whether the acknowledged Site Specific RF safety summary sheet is identical to the current version. If the user wishes to view additional details of any selected worker, they can select the view details option. The system allows the User to request that his worker become part of the system database. This request is based upon the need to provide a RF Certified or General Worker with the appropriate Site Specific RF safety summary sheet or to provide a user's worker with a Worker RF Awareness Certification. If the User is adding a new worker (step 2204), the user must select the, month and day of the birth date of the desired worker, the last 4 digits of the desired worker's Social Security Number (SSN) (or other identifier), and worker's first and last name. When the User has entered the above fields, they can select the Lookup function and the system will determine whether the worker was previously entered into the system. The system will perform an exact match on date of birth and the last 4 digits of the worker's SSN. If the worker is found in the database, an informational message will be presented and the contact information fields will be filled with the information contained in the database. If the worker is not duplicated, the user must provide the additional information about the worker such as title, address, email address, phone number.

At step 2205, the user can select a "Provide Site Specific RF safety summary sheet by Email" option. Then, the system will validate that the selected worker has an associated email. If the email exists, the system annotates the date and time that the request was sent. The system also creates a secure link and sends an email to the selected worker. If the user selects the Provide on-site option, the system will annotate the date and time that the worker was presented the electronic signature screen. If the user stops the process before selecting the Provide Site Specific RF safety summary sheet option, the system will logoff the user to restrict the worker's system access privileges.

A worker electronic signature page is implemented by the module as represented by steps 2206 and 2207 and provides reasonable evidence that the intended worker is the individual that will participate in the Trained Worker RF Certification and/or Trained Worker Site Specific RF Certification. At step 2206 the worker enters their date of birth month and day, last 4 digits of their Social Security Number, and their first and last name. The system performs an exact match on date of birth, the last 4 digits of the worker's SSN and the worker's last name. Upon all fields successfully matching, the worker will be presented with the Electronic Signature Confirmation page at a computer station being used by the worker at step 2207. The purpose of the Worker Electronic Signature Confirmation page is to affirm and record that the worker accepts the presented signature as an authorized and binding signature. The Worker Electronic Signature Confirmation screen presents the worker's personal and contact information as read-only information. It will also "stylize" the first and last name of the individual. Lastly, it will stylize the first and last name initial as the individual's electronic Initials. The individual may select the "I accept my electronic signature" or Cancel option. If the individual selects the "I accept my electronic signature" option, the system will determine the appropriate Site Specific RF safety summary sheet to present to the individual (Step 2208).

If the individual was requested for Trained Worker RF Certification only, the system will present the current version of the certification. The system will create a secure (unique) document id that is comprised of the following: First Name, Last Name, Birth Date, Last 4 digits of the worker's SSN (or other identifier), System date and time, and Document ID. The Document ID is the Document Name and Version number. For example WGRFAC-V1.7 would indicate Trained Worker RF Certification, version 1.7.

Based on the request type from the worker's employer, the system will choose next steps in the process as represented by step 2208. Option 1 is for a General Worker—Site Specific RF Safety Summary Sheet for General Worker. If the individual was requested for a Site Specific RF Safety Summary Sheet for General Worker, the system will present the Site Specific RF Safety Summary Sheet for General Worker as indicated at step 2209. The General Worker then must acknowledge to the system the RF Safety Summary Sheet for General Worker at step 2215. In step 2216, the General Worker can print the Site Specific RF Safety Summary Sheet for General Worker.

Option 2 is for a Trained Worker—Site Specific RF Safety Summary Sheet for trained Worker. In order to receive the Site Specific RF Safety Summary Sheet for a trained Worker, the worker must complete the Trained Worker RF Certification and Trained Worker Site-Specific RF Certification provided by the system. The system will determine first whether the individual has a valid Trained Worker RF Certification (Step 2210). If the worker has a valid Trained Worker RF Certification (Option 3 in Step 2210), the system proceeds to step 2212. If not (Option 4 in Step 2210), the system causes the worker to first complete the Trained Worker RF Certification (Step 2211) and the system then continues to step 2212.

After completion of the Trained Worker Site-Specific Certification (Step 2212), the worker must acknowledge his certifications (Step 2213) and this is indicated in the database. Once acknowledged, the worker can proceed to step 2214. At step 2214, the system presents the Site Specific RF Safety Summary Sheet for Trained Worker. The Trained Worker then must acknowledge the RF Safety Summary Sheet for Trained Worker (Step 2215) and the acknowledgement is indicated in the database. In step 2216, the Trained Worker can print the Site Specific RF Safety Summary Sheet for Trained Worker. The acknowledgement screens present the individual's name, current date & time, the specific site address and the system generated Secure Document ID created at the beginning of the process. The individual's previously accepted signature will be created and presented when the Sign option is selected.

Figure 23:
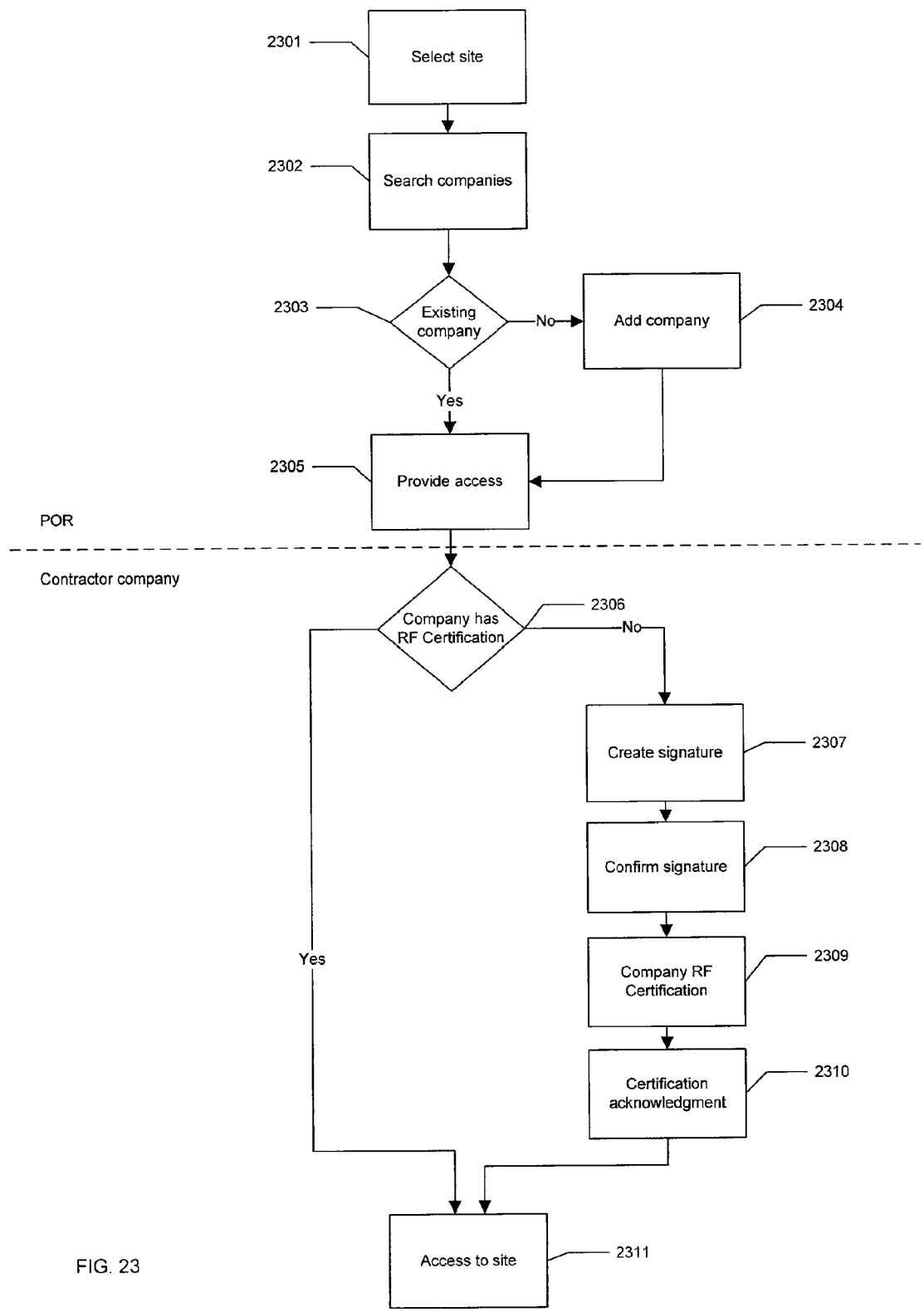
FIG. 23 is a flow diagram of further functionality provided by the RF certification module 429 of FIG. 4 which allows a user to provide contractor companies the system functionalities of site access, training and certification similar to that provided for employees.

FIG. 23 is a flow diagram of further functionality provided by the RF certification module 429 of FIG. 4 which allows a user to provide contractor companies the system functionalities of site access, training and certification similar to that provided for employees. This functionality addresses the need to provide a RF Trained or General Worker of a subcontractor with the appropriate RF Safety Summary Sheet and to provide a subcontractor's workers with Trained Worker RF Certification.

After a site is selected at step 2301, the module allows the user to find, in the database, companies (e.g., subcontractors) that are certified who also may have workers who possess: Trained Worker RF Certification, Site Specific RF Safety Summary Sheet for General Worker Acknowledgement, and Site Specific RF Safety Summary Sheet for RF Trained Worker Acknowledgement (including Site Specific RF Certification for Trained Worker). The system also allows the User to view details about a selected company or to begin the process of adding a new company to the database. At step 2302 the system provides the results of all companies with the closest company presented first and all others in ascending distance from the selected site. Information regarding the company can be presented, such as: Company name, Company Address, Number of workers with Trained Worker RF Awareness Certification, Number of the company workers that possess a valid Site Specific RF Safety Summary Sheet for RF Trained Worker, and Number of the company workers that possess a valid Site Specific RF Safety Summary Sheet for General Worker. The quantity represents the number of workers that possesses a valid Site Specific RF Safety Summary Sheet. To be considered valid, the Site Specific RF Safety Summary Sheet must be of the same version as the current version. The User may also search for a specific company name at step 2302. This system presents an ever-narrowing list of names by conducting a fuzzy match lookup as the User types. For example, as the user begins their typing, the system will return all names that best match the sequence of letters entered so far. The name can be presented along with the alphabetically ascending city and state in parenthesis. The user may also select a specific Company Type at this step. If the user wished to view additional details of any selected company, they can select the View Details option and the system will present additional information from the database related to that company. If the user wishes to add a company to the system, they can select the Add New option. If the user is adding a new company (Step 2304): The user must enter the desired Company's 9 digit Employer Identification Number (EIN) or combination of Sole proprietor's last name, date of birth and last 4 digits of SSN (Social Security Number) or other selected identifier. When the user enters a company identifier such as a Company EIN or Sole proprietor's last name, date of birth and last 4 digits of SSN, they can select the Lookup function to determine whether the company was previously entered into the system. The system can perform an exact match on, for example, Company EIN or Sole proprietor's last name, date of birth and last 4 digits of SSN. If the company is found in the database, an informational message is presented and the contact information fields will be filled with the information contained in the database. If the Company has not been previously entered, the user can create a new entry by entering the name, title, email address, phone numbers, company name and address. When the user is satisfied with their entries, they select Add to record the information in the database.

At step 2305, after the user has selected the desired company and wishes to provide that company access to their Site Specific RF Safety Summary Sheets, they select the Provide Company Access option. Selection of the Provide Company Access option causes the system to associate the selected site with the company (if not already associated) and send an email notification to the company (for example, to a selected authorized officer of the company) alerting them to the potential request for services. The system determines whether the company has not obtained their Company RF Certification, or no longer possesses a valid certification status (Step 2306), and if not, the system directs the company or its authorized officer the Company RF Certification procedure represented by steps 2307, 2308, 2309, and 2310. A purpose of the Company Electronic Signature page provides reasonable evidence that the intended company is the company that will participate in the RF Certification tutorials.

At step 2307, the Company Electronic Signature page is presented to a user, for example, by the user clicking on or following a secure link received by an email sent by the system. The sending of the email with the secure link can also be triggered by a system background task that determines when a company's certification becomes due. In that case, the system automatically sends out a re-certification email with a similar secure link as is sent for a new company. The information text in the email is prefaced with the company's responsible party's name & the Company's name. The Login ID will contain the email address of the recipient. The authorized individual must enter an identifier, for example, the company name and their 9 digit Federal Employer ID or Sole proprietor's last name, date of birth and last 4 digits of SSN. The authorized individual also enters a valid password and reconfirms the password. If the values entered by the authorized individual match those entered by the user, the Company record is created with the Login ID and Password recorded in the database. Upon all fields successfully matching, the system will present the authorized individual with the Electronic Signature Confirmation page represented by step 2308.

A purpose of the Company Electronic Signature Confirmation page is to affirm and record that the user accepts the presented signature as an authorized and binding signature. In the Company Electronic Signature Confirmation screen the system presents the company information as read-only information. It will also "stylize" the first and last name of the authorized individual to simulate an actual handwritten signature. Lastly, it will stylize the first and last name initial as the authorized individual's electronic Initials. The "I accept my electronic signature" option is enabled as is the Cancel option. If the user selects the "I accept my electronic signature" option, the system creates a secure (unique) document id. The document id can be comprised of the following: First Name, Last Name, EIN or Sole proprietor's date of birth and last 4 digits of SSN, and System date and time, Document ID. Document ID is the Document Name and Version number. For example GRFC-V1.7 would indicate RF Awareness Certification, version 1.7. This secure document id becomes part of the company's database history and can be used to provide evidence that the authorized company completed the specific training that is/was contained in the referenced document. After acceptance, the system will present the content of the applicable RF Certification tutorial and tests as represented by step 2309. The RF Certification tutorial and tests can be those discussed above in connection with Table tutorial 320 of FIG. 3. The operation of the tutorial and test is discussed further below.

At the completion of all of the tutorial sections and passing the certification tests, a final signature must be obtained as represented by step 2310. At this step the system presents the individual's name, current date & time and the system generated Secure Document ID created at the beginning of the tutorial process. The individual's previously accepted signature will be created and presented when the Sign button is selected. Selection of the Sign button will present the individual's signature created in the Company Electronic Signature page. After this the user is enabled to access the system as represented by step 2311. For example, the user can be presented with the Continue to Web Site button.

Figure 24:
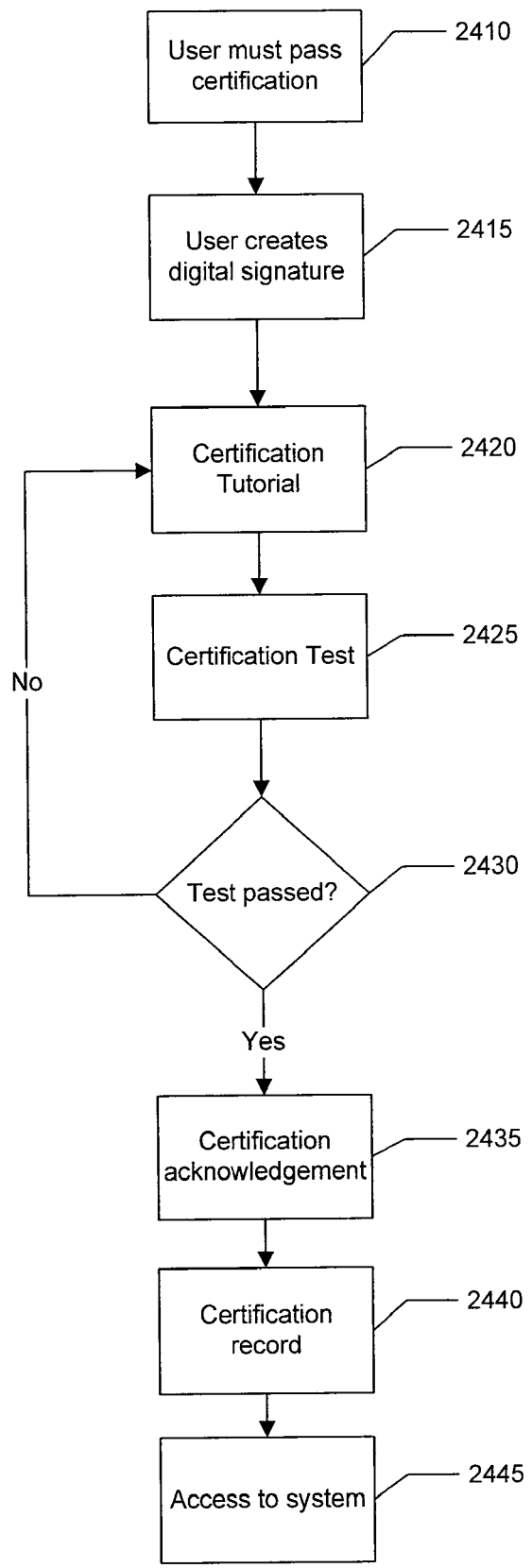
FIG. 24 is a flow diagram of further functionality provided by the RF certification module 429 of FIG. 4 which ensures a user's required RF certification before starting to use the system.
Figure 25:
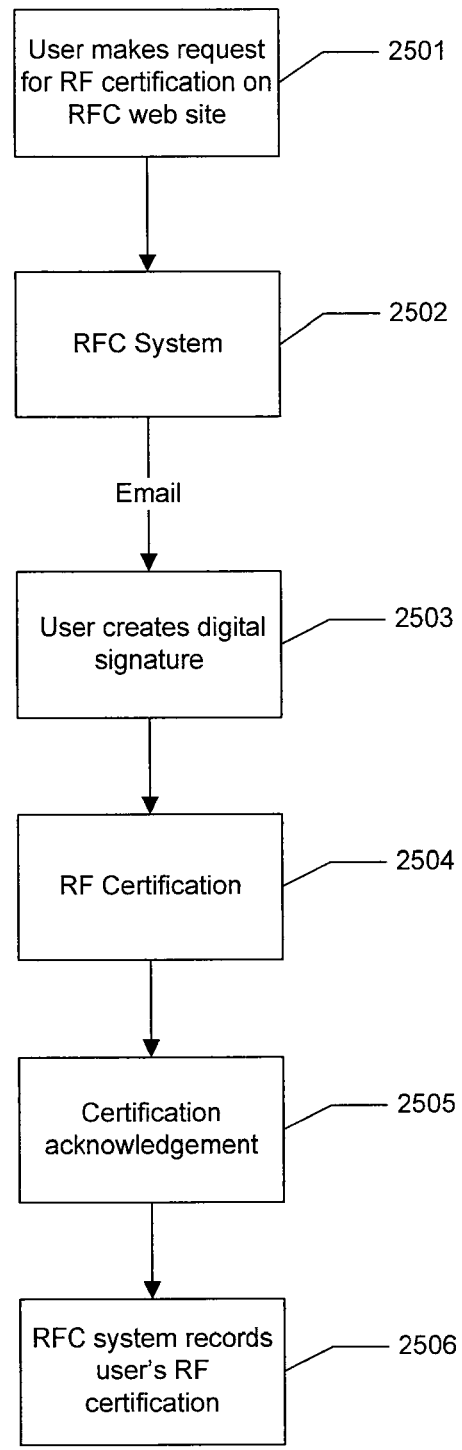
FIG. 25 is a flow diagram of further functionality provided by the RF certification module 429 of FIG. 4 which allows user to be RF certified upon his own request.

FIGS. 24 and 25 are flow diagrams of a processes for a user to obtain certification which can be implemented by the RF certification module 429 of FIG. 4. For example, this process can be used whenever the system requires a user to have a type of certification as represented by FIG. 24 or at the request of a user as represented by FIG. 25.

Referring to FIG. 24, the system determines that a user requires certification which is represented by step 2410. The system then directs the user to the beginning of the process for the appropriate certification. The user then creates a digital or electronic signature as represented by step 2415. That process has been described in connection with step 2206 of FIG. 22. Next, the user is taken through a certification process as represented by steps 2420, 2425 and 2430 In one embodiment, the certification process starts with the tutorial contained in the Table tutorial 320 of FIG. 3. The content of the certification process can be based upon government safety rules or laws or can be selected by the system operator. In one embodiment, the process is an interactive tutorial. Alternatively, written materials can be provided electronically. The certification process includes presenting a test to the user at the end of the tutorial as represented by step 2425. The test and the questions are stored in the tables 325 and 330 of FIG. 3. At step 2430 the system compares the user's test score with a minimum score on the test that is required in order to obtain the certification. If the user's score is less then the minimum required score, the user is redirect back to step 2420—certification tutorial. If the user passes the test, he must acknowledge his certification (2404) and this is indicated in the database. At step 2440 the system creates a record about the user certification using table 340 of FIG. 3. At step 2445 access to the system is granted to the user and—the user is directed to an initial page such as are implemented by modules 422 and 424 shown in FIG. 4.

Referring now to FIG. 25, a similar process for a user to obtain a certification at the request of the user is shown. The process can begin with a user making a request for a certification, for example at a public page provided by the system, such as a home page, which is represented by step 2501. The system then directs the user to the beginning of the process for the appropriate certification (2502). The user then creates a digital or electronic signature as represented by step 2503. That process has been described in connection with step 2206 of FIG. 22. Next, the user is taken through a certification process as represented by step 2504. The content of the certification process can be based upon government safety rules or laws or can be selected by the system operator. In one embodiment, the process is an interactive tutorial. Alternatively, written materials can be provided to the user electronically. The certification process includes presenting a test to the user at the end of the tutorial. A minimum score on the test can be required in order to obtain the certification. That process has been described in connection with steps 2420, 2425 and 2430 of FIG. 24. The user then must acknowledge his certification (2505) and this is indicated in the database (2506).

Figure 26:
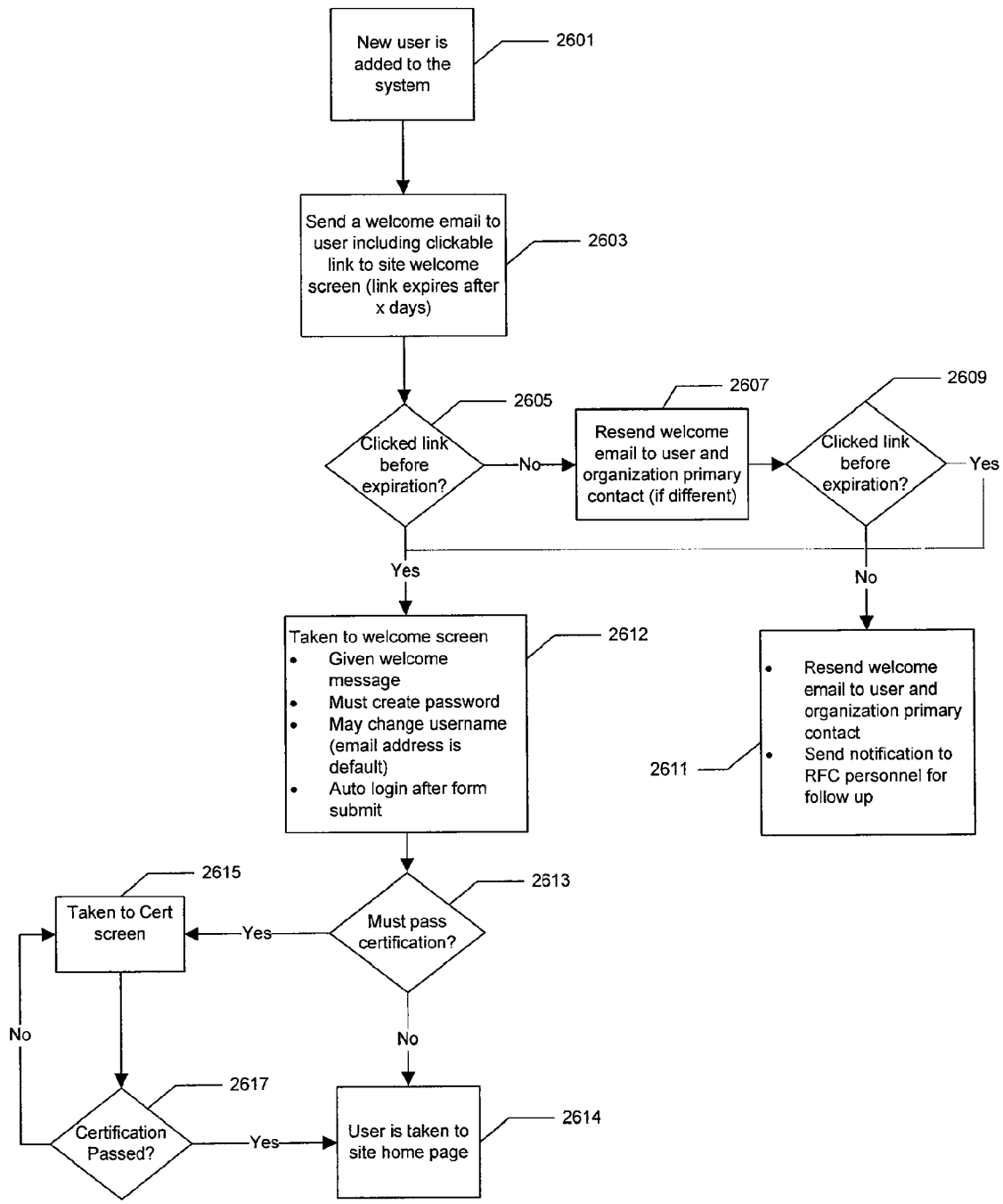
FIG. 26 is a flow diagram of further functionality provided by the RF certification module 429 of FIG. 4 and shows in details user's account activation including required RF certification.

FIG. 26 is a flow diagram of further functionality which can be provided by the RF certification module 429 of FIG. 4. In general, the method shown in FIG. 26 is an example of how the module allows new users to be added, sends the new user an invitation (e.g., an email) and to begin the certification process if required.

Referring to FIG. 26, an administrator or existing using can add a new user by enter certain data about the new user, such as a name and email address as represented by step 2601. The system then contacts the new user, for example by sending an email with a link (step 2603). At step 2605, if the link is not activated before it expires, the email is re-sent (step 2607) and others can be notified. If the new user again fails to respond (step 2609) others can again be contacted and the email can be resent again (step 2611).

When the user responds to the invitation, they are taken through a welcome and registration process (step 2612). New users that need to pass certification (step 2613) are directed to a certification process represented by steps 2615 and 2617. This can be the process represented by FIG. 24. The content of the certification process can be based upon government safety rules or laws or can be selected by the system operator. A test can be presented to the user at the end of the tutorial (step 2617) and minimum score on the test can be required in order to obtain the certification. Then, the user is directed to an initial page such as are implemented by modules 422 and 424 shown in FIG. 4.

Besides the method described above, the system also allows a user (e.g., a worker or a sub-contractor) to initiate their certifications by clicking on a link or activating a button in other screens of the system such as the public web site (step 2501). The system then processes the user request and sends the user an email that contains a link to certification screens (step 2502). Completion of the Trained Worker RF Certification allows the worker to accelerate their future request for Site-Specific RF Certification by skipping step 2211 of FIG. 22. By completing the Trained Worker RF Certification, the worker also becomes part of the database system and is listed in the system as a RF trained worker. The worker becomes visible for other users of the system seeking a worker with an RF Trained Worker Certification. Completion of the Company RF Certification allows a company to accelerate a future request for accessing the system by skipping steps 2307-2310 from FIG. 23. By completing the Company RF Certification, the contractor company also becomes part of the system and is listed in the database as a company with RF Certification. The Company becomes visible (searchable) for other users of the system seeking a company with RF Certification.

Various embodiments may be implemented using a combination of both hardware and software.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such the processor can read information from, and write information to, the storage medium. In the alternative, the storage medium can be integral to the processor. The processor and the storage medium can reside in an ASIC.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention. References to a "page" refer to a visual display of information such as a web page or other representation of information presented to a user on a computer display device.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for managing safety training certification for radio transmission relating to radio transmission sites, comprising:
receiving data regarding the radio transmission sites from a plurality of sources;
maintaining a database with the received data;
one or more processor calculating power densities for radio frequency (RF) antennas at a transmission site in the database and generating a maximum permissible exposure map, the maximum permissible exposure map including graphic representations of the power densities at the transmission site;
identifying users in a database based upon their training certification status;
defining search parameters;
accepting search criteria selected by a user;
transmitting a search request based upon selected search criteria;
the one or more processor providing search results to the user;
providing with the search result a Site Specific RF Safety Summary Sheet pertaining to the transmission site generated from the data regarding the radio transmission sites to only users having a predetermined training certification status, the Site Specific RF Safety Summary Sheet including the maximum permissible exposure map; and
creating a record in the database that the Site Specific RF Safety Summary Sheet pertaining to the transmission site was provided to the user.

2. The method of claim 1, wherein the data received from a plurality of sources is used to define spatial relationships between multiple antennas.

3. The method of claim 1 further comprising providing access to the database to a user based upon a classification of the user.

4. The method of claim 3 wherein the database includes a designation of representatives and properties of property owner and access data in the database by the representatives is limited to data associated with existing sites on the properties associated with the representatives.

5. The method of claim 3 wherein a representative of a network operator can view data associated with existing and proposed sites of that network operator.

6. The method of claim 3 wherein access to data in the database is limited such that a local regulator's access is limited to existing and proposed sites within the local regulator's jurisdiction, and wherein access to data in the database is limited such that a member of the public is limited to existing and proposed sites within a defined radius from a residence of the member of the public.

7. The method of claim 3 wherein, access to the data associated with an existing site can be granted to identified individuals assigned to perform work at that site.

8. A computerized safety system for managing safety training certification for radio transmission relating to transmission sites, comprising:
a database sever storing
transmitter information for radio frequency (RF) transmitters located at transmission sites obtained from a plurality of wireless telecommunication companies and indexed by site, and
records of users and their training certification status; and
an application sever comprising
a processor, and
a memory storing instructions for execution by the processor, the instructions comprising:
a site search module configured to define search parameters, accept search criteria selected by a user, transmit a search request based upon selected search criteria, and provide search results to the user;
a maximum permissible exposure module configured to calculate power densities for antennas in the database and create a maximum permissible exposure map for each transmission site, each maximum permissible exposure map including graphic representations of the power densities,
a certification module configured to
identify users in the database based upon their training certification status,
provide a Site Specific RF Safety Summary Sheet pertaining to a transmission site to only users having a predetermined training certification status, the Site Specific RF Safety Summary Sheet including the maximum permissible exposure map, and
create a record in the database that the Site Specific RF Safety Summary Sheet pertaining to the transmission site was provided to the user.

9. The system of claim 8, wherein the certification module is further configured to provide tutorials to users and record in the database whether the training was completed.

10. A method for managing safety training certification for radio transmission relating to radio transmission sites and for maintaining data relating to those sites, the method comprising:
- maintaining a database of information relating to transmission sites with antenna structures having one or more antennas;
- calculating radiation pattern maps of the radio frequency (RF) densities of two or more antennas at transmission site and including that information in a Site Specific RF Safety Summary Sheet;
- providing certification to users;
- identifying users in the database based upon their training certification status;
- defining search parameters;
- accepting search criteria selected by the users;
- transmitting a search request based upon the selected search criteria;
- providing search results to the users;
- one or more processors providing the Site Specific RF Summary Sheet pertaining to the transmission site to only users having a predetermined training certification status; and
- creating a record in the database that the Site Specific RF Safety Summary Sheet pertaining to the transmission site was provided to the user.

11. The method of claim 10, further comprising using the data from a plurality of sources to calculate the radiation pattern maps of the radio frequency densities of two or more antennas at the site and including that information in the Site Specific RF Safety Summary Sheet.

12. The method of claim 10, wherein the radio frequency densities are used to create radiation pattern maps with projected gradation patterns of the radio frequency density.

13. The method of claim 12, wherein the radiation pattern maps further comprise indications of areas where the radio frequency density exceeds maximum exposure limits for the general public but do not exceed occupational limits and therefore can be accessed by workers having the appropriate certification.

14. The method of claim 13, wherein the radiation pattern maps further comprise indications of areas where the radio frequency density exceeds occupational limits and must not be accessed by any worker.

15. A method for managing safety training certification for radio transmission relating to radio transmission sites and for maintaining data relating to those sites using a computer network system, the method comprising:
- maintaining an RF site database on a server comprising the location of sites, camera images of sites, information regarding the physical layouts of sites, antenna system (AS) information for antenna systems located at sites including broadcast frequencies and power, and data for site specific RF Safety Summary Sheets for the sites, the data for site specific RF Safety Summary Sheets including graphic representations of calculated power densities for antennas in the database at the sites;
- one or more processors determining the calculated power densities for antennas in the database and generating the graphical representations of the calculated power densities when a change is made to the sites and updating the RF site database with the determined values and graphical representations;
- maintaining a database of user certification information and receipt by users of RF Safety Summary Sheets by tracking certifications completed and acknowledged by users and RF Safety Summary Sheets acknowledged as received by users;
- providing training and testing via the computer network system to users to establish certification of the users and updating the database of user certification information to indicate the results of the training and testing;
- providing search results to users including defining search parameters, accepting search criteria selected by users, transmitting search request based upon selected search criteria, and transmitting search results to users; and
- controlling access by users to site specific RF Safety Summary Sheets based upon the certification of users indicated in the database of user certification information.

16. The method of claim 15 further comprising providing access to the RF site database to a user based upon a classification of the user stored in the database of user certification information.

* * * * *